United States Patent [19]

Breu

[11] Patent Number: 5,082,534
[45] Date of Patent: Jan. 21, 1992

[54] PYROLYTIC CONVERSION SYSTEM

[75] Inventor: Fred A. Breu, N. Canton, Ohio

[73] Assignee: Wayne Technology, Inc., Victor, N.Y.

[21] Appl. No.: 494,256

[22] Filed: Mar. 14, 1990

[51] Int. Cl.[5] .............................................. C10B 1/10
[52] U.S. Cl. .................................. 202/131; 201/7; 201/32; 202/113; 202/218; 202/226; 202/241; 202/262
[58] Field of Search ................ 202/131, 136, 218, 222, 202/226, 241, 265, 113; 201/7, 32, 33; 432/112, 113, 115, 118; 241/171, 176

[56] References Cited

U.S. PATENT DOCUMENTS

| | | |
|---|---|---|
| 1,171,583 | 2/1916 | Benson . |
| 1,236,885 | 8/1917 | Seaman . |
| 1,647,273 | 11/1927 | Clayton-Kennedy ............... 202/265 |
| 1,881,826 | 10/1932 | McQuade ............................ 202/218 |
| 2,697,068 | 12/1954 | Poindexter . |
| 3,098,458 | 7/1963 | Lantz . |
| 3,621,506 | 11/1971 | Armstrong et al. ................ 202/241 |
| 3,787,292 | 1/1974 | Keappler . |
| 3,801,469 | 4/1974 | Essenhigh . |
| 3,980,439 | 9/1976 | Mayer . |
| 4,038,152 | 7/1977 | Atkins . |
| 4,038,184 | 7/1977 | Swanteson . |
| 4,064,018 | 12/1977 | Choi . |
| 4,102,773 | 7/1978 | Green . |
| 4,122,036 | 10/1978 | Lewis .................................... 201/32 |
| 4,126,519 | 11/1978 | Murray . |
| 4,145,274 | 3/1979 | Green . |
| 4,153,514 | 5/1979 | Garrett . |
| 4,183,726 | 1/1980 | Seebald ............................... 432/118 |
| 4,243,489 | 1/1981 | Green . |
| 4,284,616 | 8/1981 | Solbakken . |
| 4,361,333 | 11/1982 | Firth .................................... 202/222 |
| 4,367,075 | 1/1983 | Hartwig .............................. 202/131 |
| 4,374,704 | 2/1983 | Young ................................. 202/241 |
| 4,401,513 | 8/1983 | Brewer . |
| 4,404,086 | 9/1983 | Oltrogge . |
| 4,412,889 | 11/1983 | Oeck . |
| 4,463,203 | 7/1984 | Gi . |
| 4,507,174 | 3/1985 | Kutrieb . |
| 4,588,477 | 5/1986 | Habib . |
| 4,645,133 | 2/1987 | Hagiwara et al. .................. 241/171 |
| 4,647,443 | 3/1987 | Apffel . |
| 4,648,328 | 3/1987 | Keough . |
| 4,868,007 | 8/1987 | Lyakhevich . |
| 4,872,954 | 10/1989 | Hogan ................................. 202/131 |

FOREIGN PATENT DOCUMENTS

| | | |
|---|---|---|
| 324668 | 7/1989 | European Pat. Off. . |
| 2810838 | 10/1979 | Fed. Rep. of Germany . |
| 8802284 | 4/1988 | PCT Int'l Appl. . |
| 146287 | 8/1921 | United Kingdom . |

Primary Examiner—Joye L. Woodard
Attorney, Agent, or Firm—Martin Lukacher

[57] ABSTRACT

A rotary, continuous pyrolytic conversion system converts solid hydrocarbon containing feedstocks into gases, liquid hydrocarbons and char. A converter drum is contained within an outer drum which is in substantially air-tight relationship with an injector for introducing the feedstock in the form of bales and with a discharge chute for the solid products of pyrolysis. A casing around the outer stationary drum defines an oven chamber which is heated by combustion products. A rod extends into the injection end of the converter drum for supporting scrapers against the inner periphery of the converter drum. A crusher bar is carried in the drum at the discharge end thereof and crushes the solid products. A second pyrolysis reactor may receive the solid pyrolysis products and be operative at higher temperature than the first converter to destroy chlorinated hydrocarbons.

41 Claims, 16 Drawing Sheets

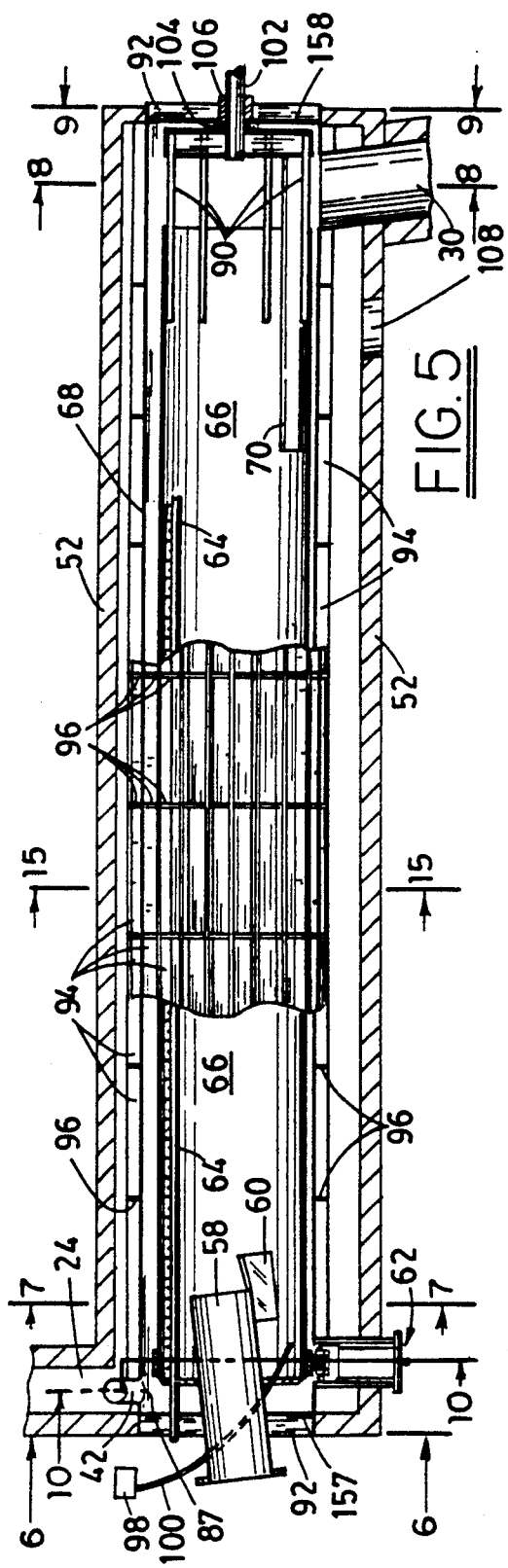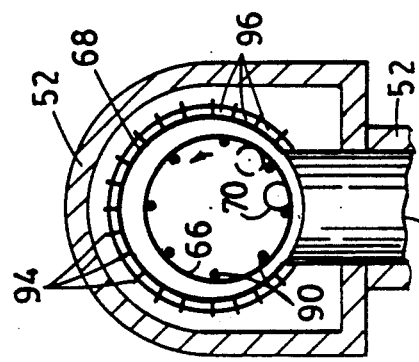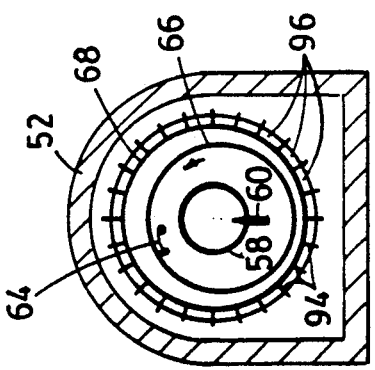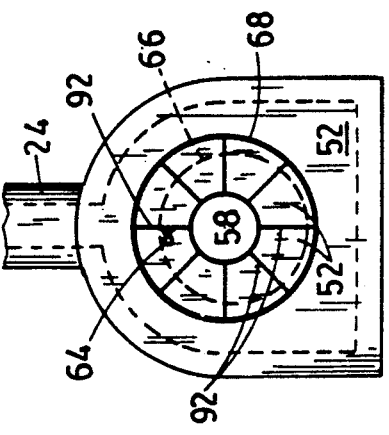

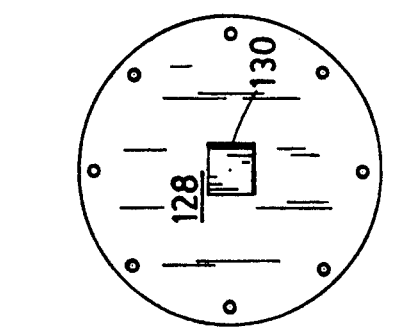
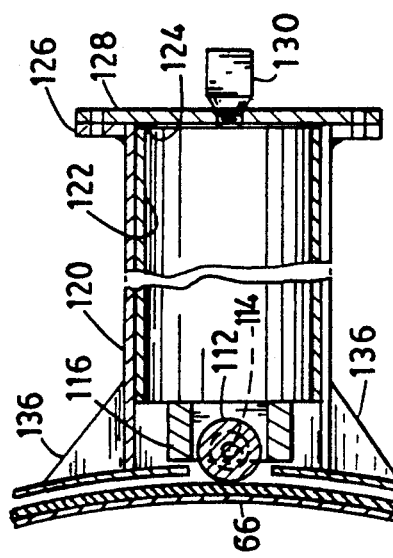
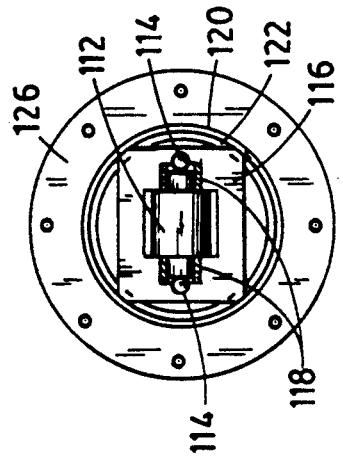
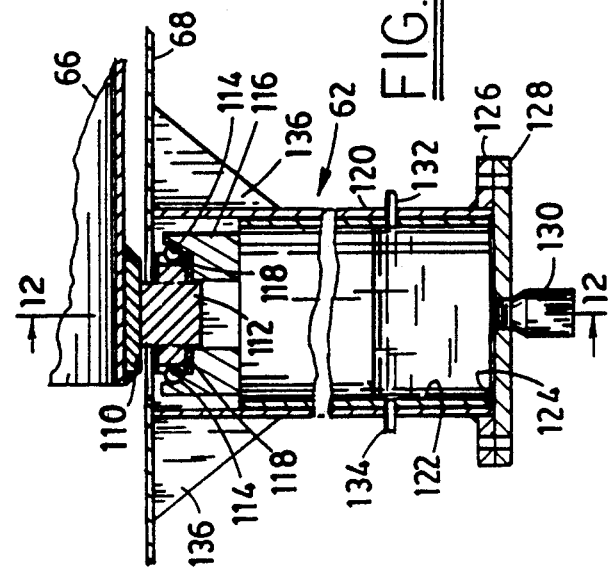
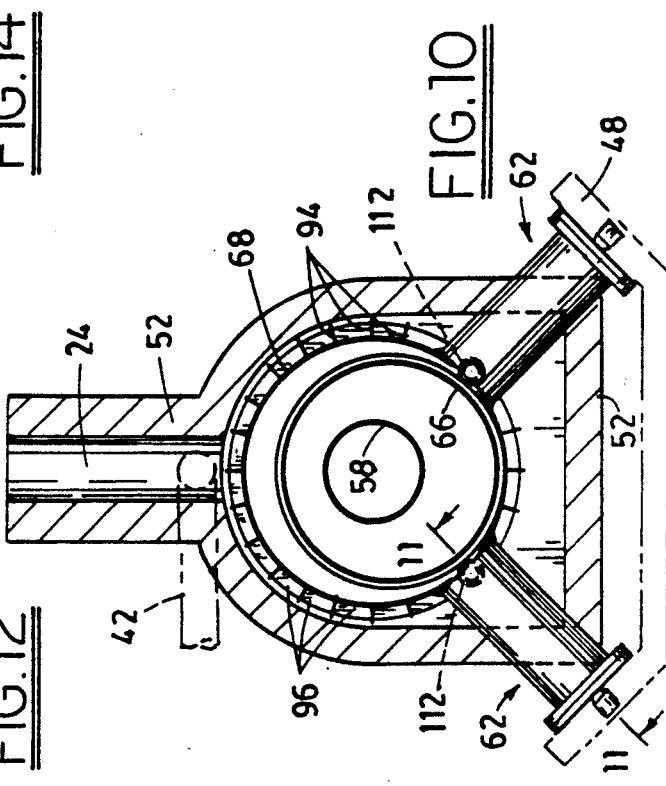

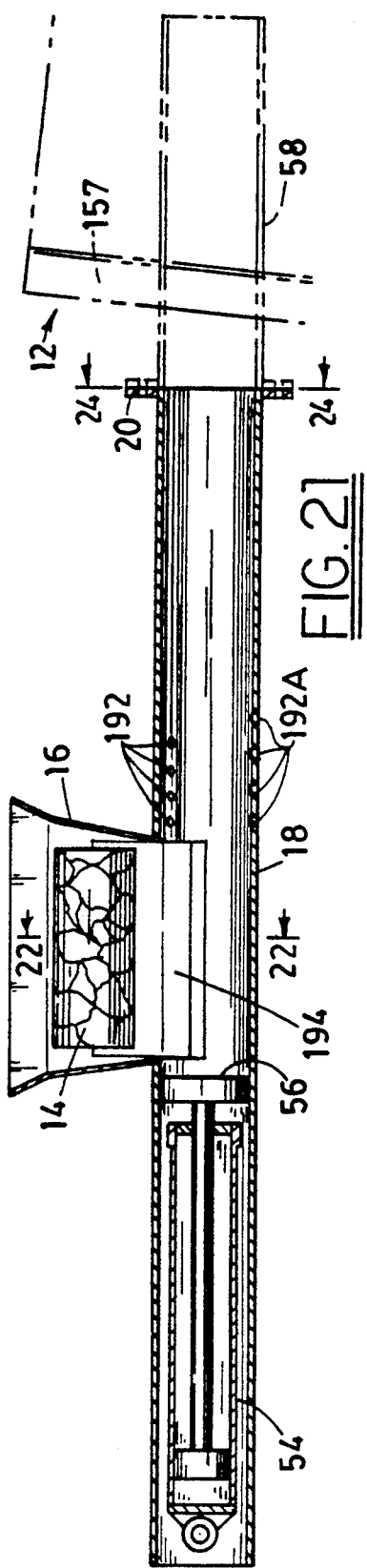
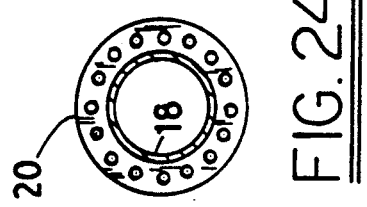
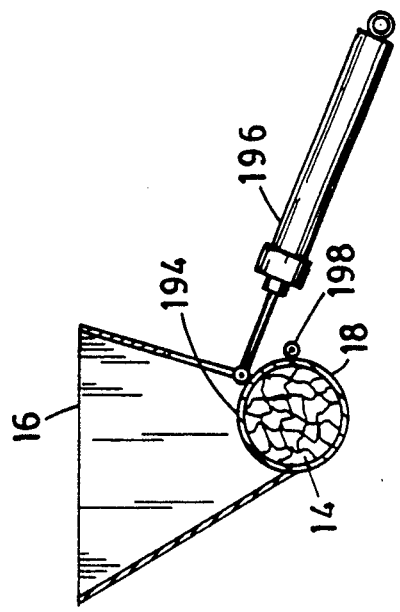
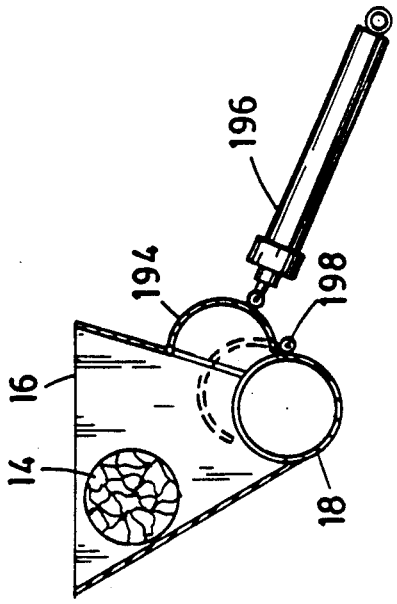

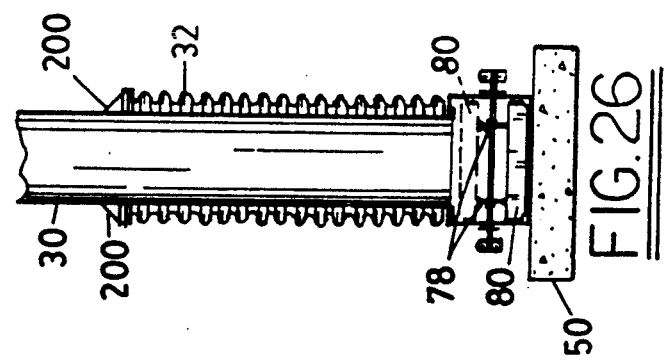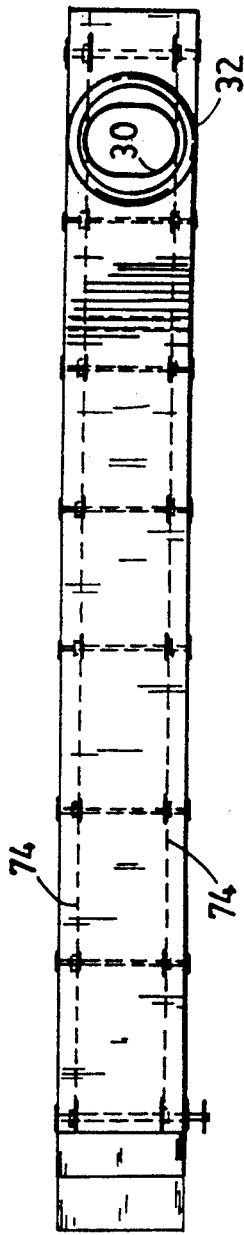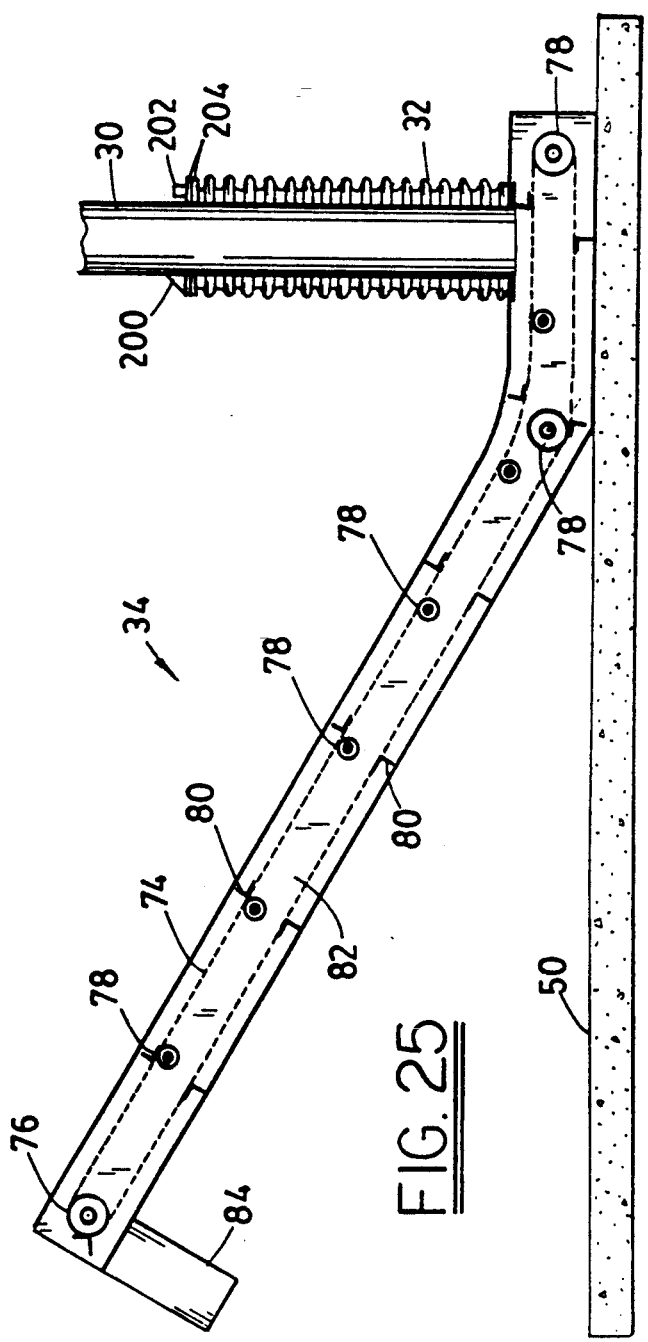

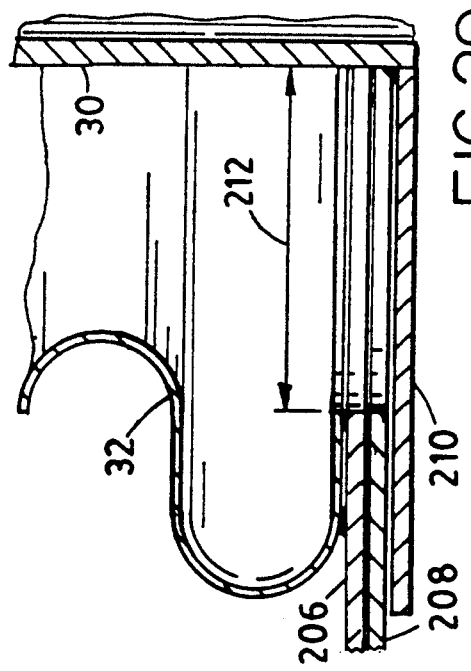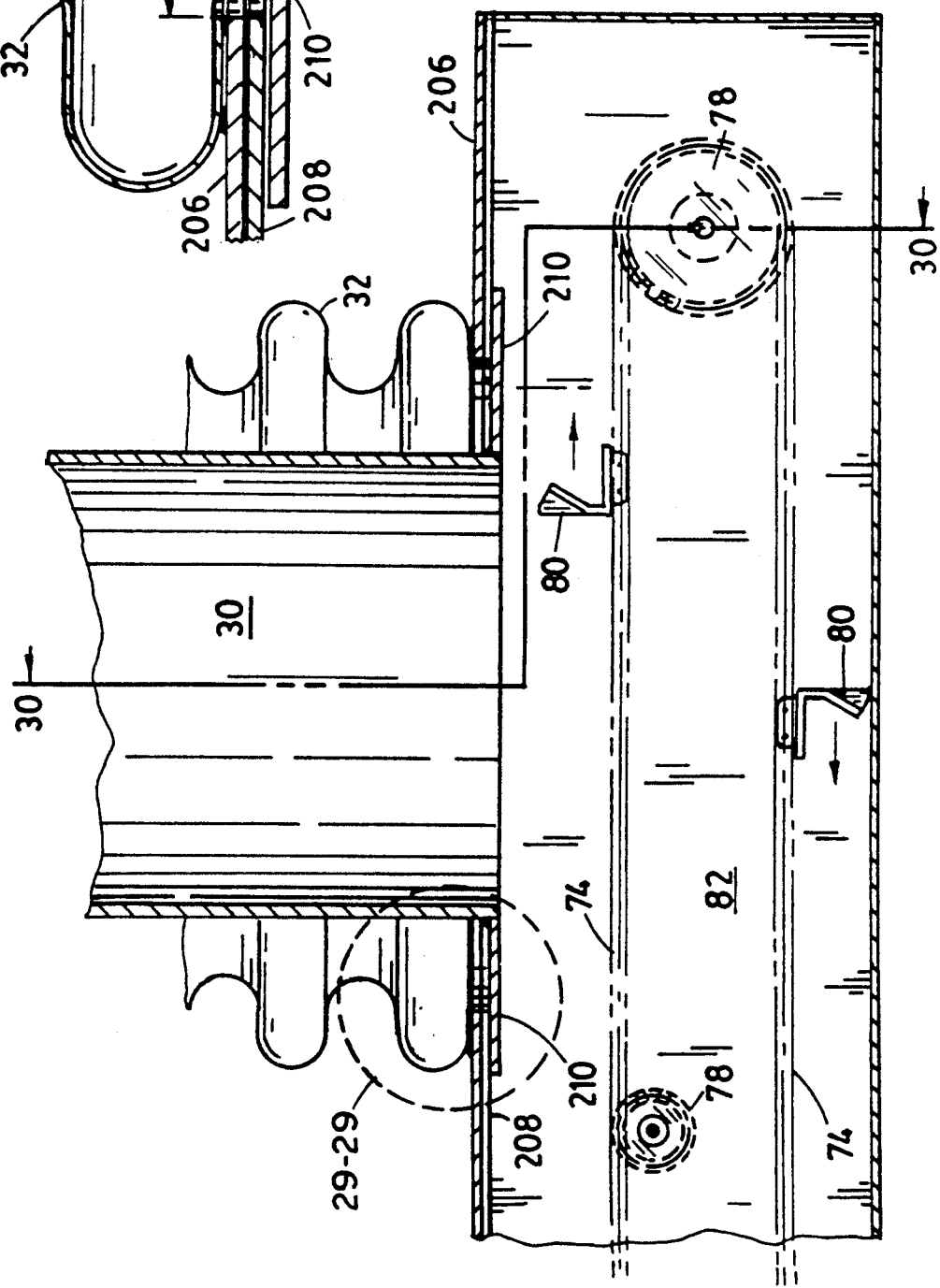

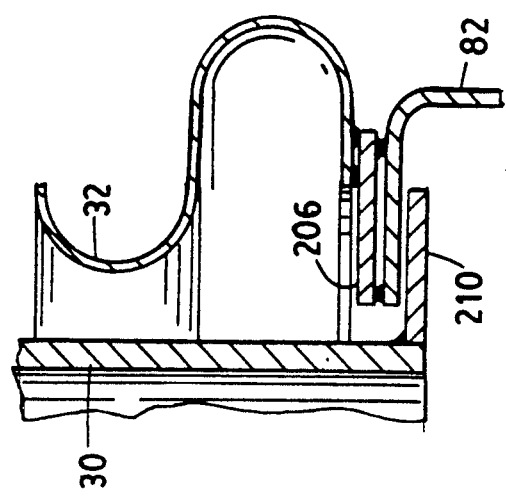
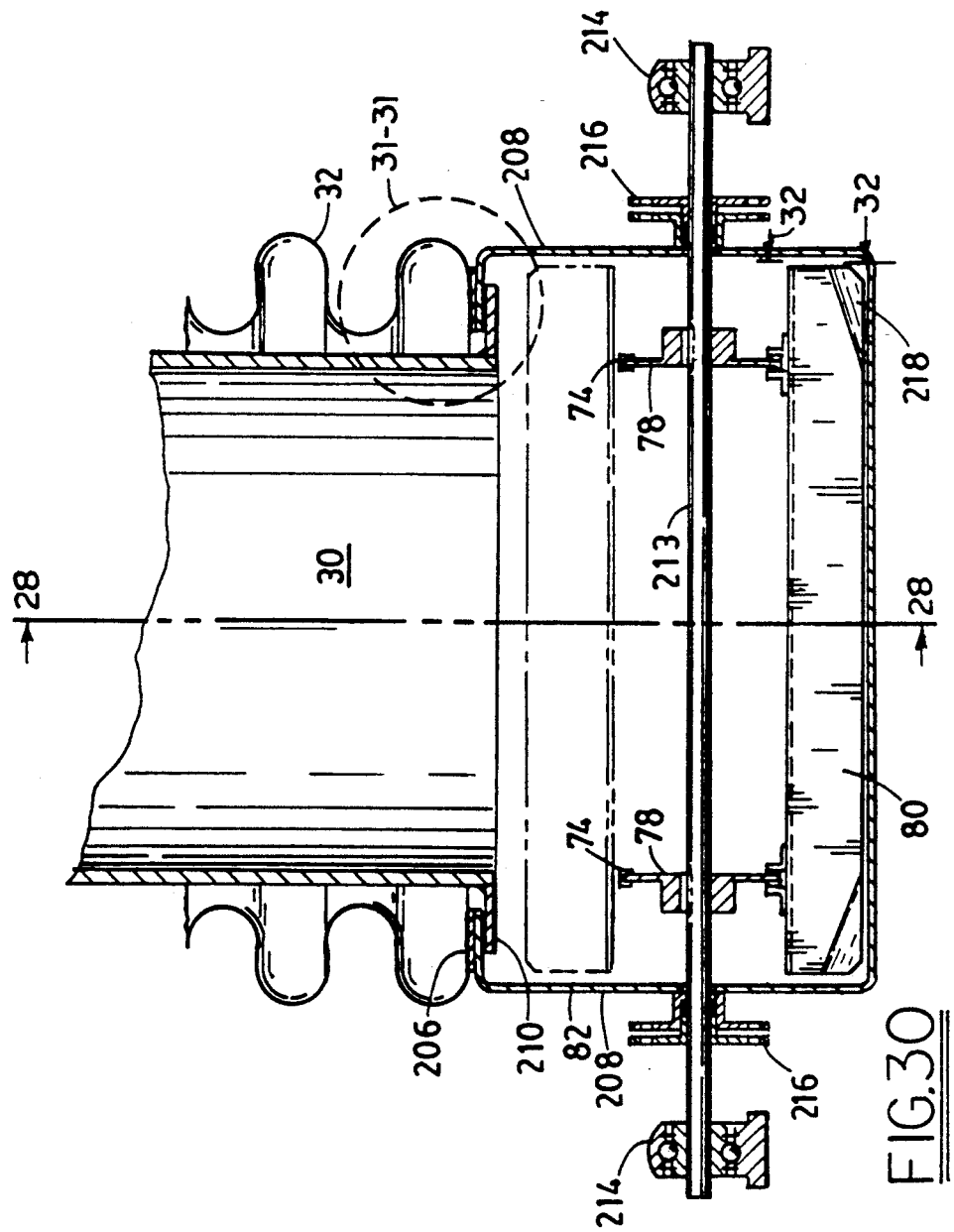

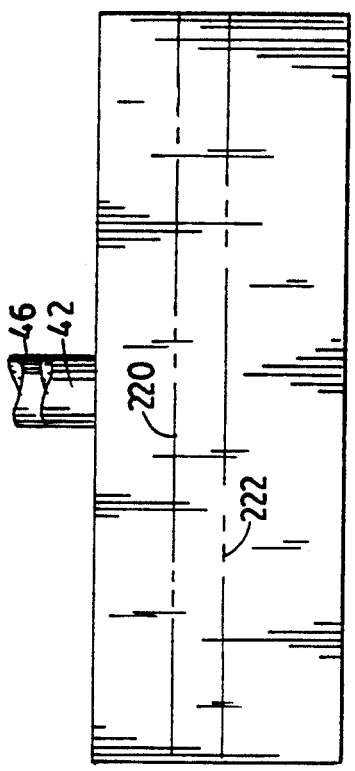
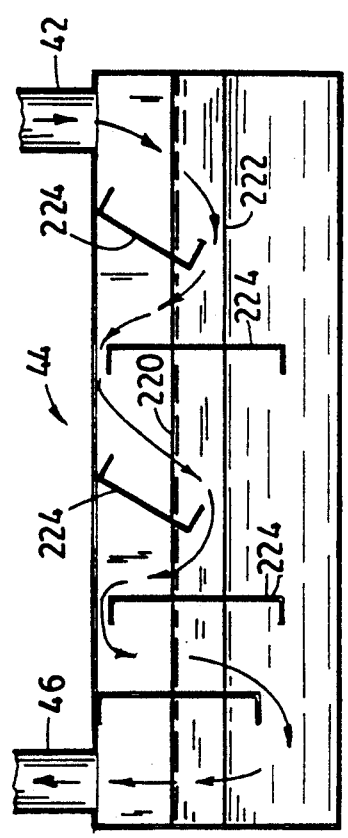
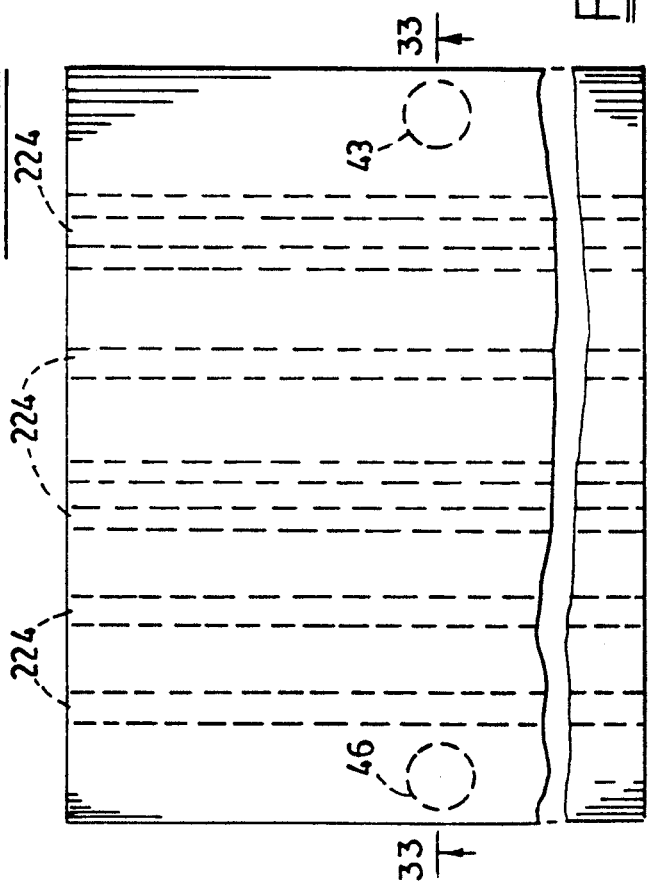

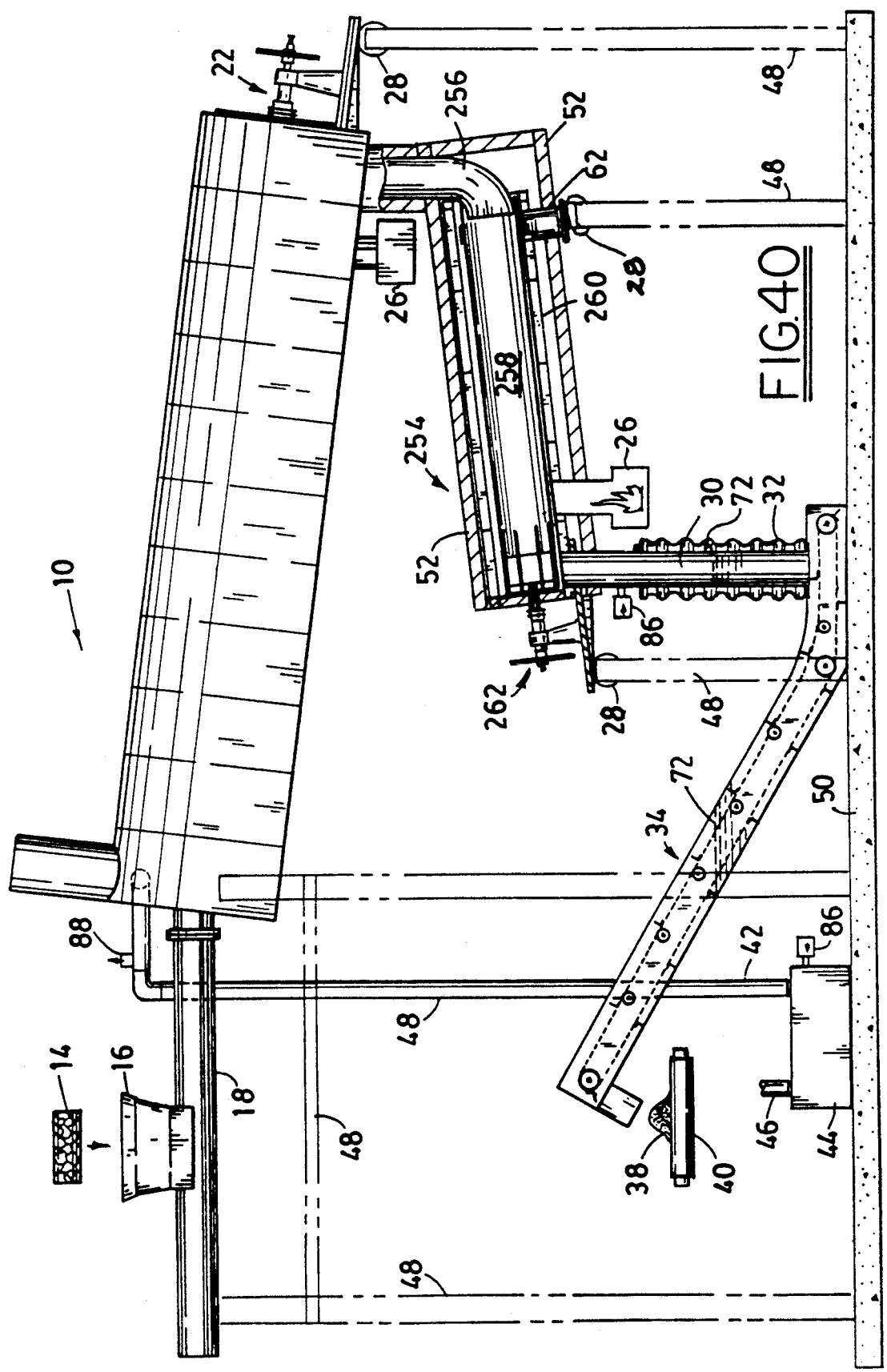

PYROLYTIC CONVERSION SYSTEM

DESCRIPTION

The present invention relates to pyrolysis conversion systems (methods and apparatus), and particularly to systems utilizing rotary drum pyrolytic converters.

The invention is especially suitable for use in the pyrolytic conversion of solid hydrocarbons into gases, liquid hydrocarbons and char by the pyrolysis of various feed stocks, such as the tires and plastic waste resulting from shredding of junked automobiles. The system is also adapted for pyrolyzing other waste, such plastic containers and trays from fast food restaurants, garbage, sewage sludge, coal, oil shale, broken asphalt and the like which may be comminuted and mixed to provide the feed stock for the converters of the system.

Pyrolytic converters as have heretofore been provided have required conveyers, augers, or carts for moving the materials to be pyrolyzed through the converter. Practical and reliable operation of pyrolysis converters has not been obtained because such devices must operate at high temperatures, for example, exceeding 1,000° F. Also the material to be processed and the products of pyrolysis, solids, liquids and gases must be introduced and discharged without adversely affecting the integrity of the converter, so that air cannot enter the converter and interfere with the pyrolysis process or engender dangerous, explosive conditions. Pyrolysis reactions also result in the formation of gums and clumps which interfere with the transfer of heat to the material being pyrolyzed as well as with the discharge of the products of pyrolysis.

The solution of the foregoing problems without introducing complexities in design and operation which would affect the reliability and maintainability of the system is the principal feature of the invention. The invention also addresses the need for flexibility in the capacity of the system and makes it possible to increase the capacity of the system without extensive modifications.

Accordingly, it is the principal objective of the present invention to provide an improved pyrolytic conversion system.

It is another object of the present invention to provide an improved pyrolytic converter utilizing a rotary drum.

It is a still further object of the invention to provide an improved pyrolytic conversion system capable of processing various types of hydrocarbon containing materials and which is reliable and maintainable.

It is a still further object of the present invention to provide an improved pyrolytic conversion system which can be expanded in capacity without extensive modification.

It is still another object of the invention to provide an improved pyrolytic conversion system capable of destroying environmentally unsafe hydrocarbon materials, such PCB's.

It is a still further object of the present invention to provide an improved pyrolytic conversion system which is less complex in design and has fewer moving parts than prior systems, and has essentially no moving parts within the converter drum thereof.

Briefly described, a pyrolytic conversion system in accordance with the invention handles solid hydrocarbon containing materials. It utilizes a converter drum having opposite ends; the first of which is elevated above the second. The drum also has an axis of rotation about which it is rotatable. There is an outer stationary drum disposed around the converter drum. This stationary drum defines a chamber (which is maintained substantially air-tight) within which the converter drum is disposed. A casing is disposed around the outer drum and defines an oven chamber. Means are provided for heating the oven chamber to maintain the converter drum at a temperature sufficient to pyrolyze materials of interest. Means are provided which are in communication with the chamber formed by the outer drum, which are located near the first end of the converter drum, for extracting product gases of pyrolyzation. Other means are disposed in essentially airtight relationship with the chamber formed by the outer drum, which are located near the second end of the converter drum, for the discharge of the solid products of pyrolyzation. Means are provided which extend through the chamber formed by the outer drum for injecting the materials to be treated into the first end of the converter drum while essentially excluding air from the chamber formed by the stationary drum. Hot gases flow through the oven chamber and are transferred, through the chamber formed by the outer drum, to the converter drum. The hydrocarbon materials are motivated by gravity and the rotation of the converter drum and move as they are being pyrolyzed from the first end to the second end where the solid products of pyrolyzation are discharged, while the gaseous and volatile products are extracted near the first end of the converter drum. No conveyers, augers or other transports are used within the converter drum.

The foregoing and other objects, features and advantages of the invention, as well as presently preferred embodiments thereof, will become more apparent from a reading of the following description in connection with the accompanying drawings in which:

FIG. 5 is an enlarged, longitudinal cross-sectional view showing the converter drum, the outer drum and the casing providing the oven chamber;

FIG. 6 is an end view taken along the line 6—6 in FIG. 5;

FIG. 7 is a sectional view taken along the line 7—7 in FIG. 5;

FIG. 8 is a sectional view taken along the line 8—8 in FIG. 5, for

FIG. 9 is an end view taken along the line 9—9 in FIG. 5;

FIG. 10 is a sectional view taken along the line 10—10 in FIG. 5;

FIG. 11 is a fragmentary sectional view taken along the line 11—11 in FIG. 10;

FIG. 12 is a fragmentary sectional view taken along the line 12—12 in FIG. 11;

FIG. 13 is plan view of the roller assembly shown in FIGS. 11 and 12;

FIG. 14 is a bottom view of the roller assembly shown in FIG. 13;

FIG. 21 is a longitudinal cross-sectional view of the injector tube assembly which is located at the inlet end of the converter drum;

FIGS. 22 and 23 are cross-sectional views taken along the line 22—22 in FIG. 21 and showing the injector tube bale receiving cover in open and close positions respectively;

FIG. 24 is a sectional view along the line 24—24 in FIG. 21;

FIG. 25 is a side elevation of the discharge chute and conveyor assembly of the of the system shown in FIG. 1-4;

FIG. 26 is an end view of the assembly shown in FIG. 25 taken from the right as viewed in FIG. 25;

FIG. 27 is a plan view of the assembly shown in FIG. 25;

FIG. 28 is an enlarged, fragmentary cross-sectional view of the bottom of the discharge chute and the conveyor assembly which is shown in FIG. 25-27; the view being taken along the line 28—28 in FIG. 30;

FIG. 29 is an enlarged, fragmentary, sectional view of the portion of the assembly shown in FIG. 28, the view taken within the line 29—29 of FIG. 28;

FIG. 30 is a sectional view taken along the line 30—30 in FIG. 28;

FIG. 31 is an enlarged view of FIG. 30 taken along the line 31—31 in FIG. 30;

FIG. 32 is an enlarged end view of one of the scraper bars of the conveyor assembly taken along the line 32—32 in FIG. 30;

FIG. 33 is an cross-sectional view of the condenser tank shown in FIGS. 1-4 and one of the condenser tanks shown in FIG. 39, the section being taken along the line 33—33 in FIG. 35;

FIG. 34 is a side elevation of the condenser shown in FIG. 33;

FIG. 35 is a bottom view of the condenser shown in FIG. 33;

FIG. 40 is a side elevation of a pyrolytic conversion system utilizing a secondary pyrolytic converter at the discharge end of a first converter, the secondary converter being similar to the converter shown and described in connection with FIGS. 1 to 38.

Figure 1:
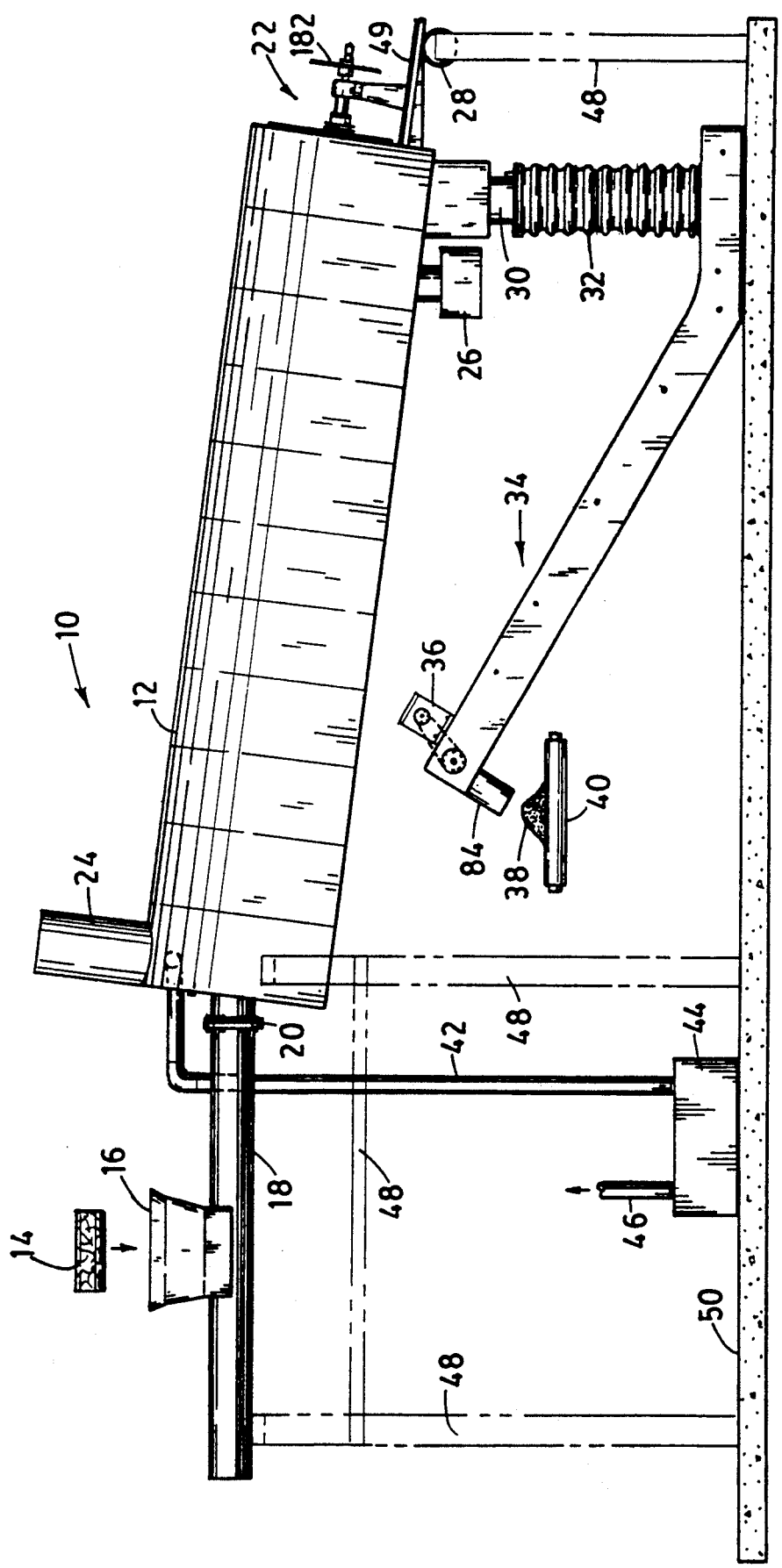
FIG. 1 is a side elevational view of a pyrolytic conversion system embodying the invention.

Referring to FIGS. 1-4 there is shown a pyrolytic converter system 10 having a single pyrolytic converter 12. A plurality of such converters may be operated in parallel in an expanded system when greater capacity for handling more feedstocks within a given period of time is required. A expanded system is shown schematically in FIG. 39 and will be described hereinafter. The size of the converter 12 and other components of the system 10 also depends upon the desired feedstock handling capacity of the system. A small scale or pilot system may utilize a converter 12 which is about 21.5 feet long and about 38 inches in diameter across the outside thereof. A full scale system may typically have a converter 12, 40 feet long and of a outer diameter of about 114 inches. All such dimensions are typical and approximate. It will be appreciated that the system may be scaled to meet specified capacity and other operating and performance requirements.

The feedstocks are prepared in a storage and preparation section of the system 10 which is not shown in the drawings. Conventional shredders, mixers and balers may be used to form the feedstock into comminuted pieces. The system preferably uses mixtures of different types of materials for its feedstocks. Each type which is mixed has a different melting point. This mixture of materials with different melting points facilitates smooth movement of the feedstock through the converter 12 without clogging and gumming thereof, as pyrolysis proceeds.

The drawings show a typical bale 14. These bales are cylindrical and approximately the same diameter as an injection tube 18, which is part of the apparatus for introducing the feedstock into the converter 12. Another part of the introduction apparatus is a hopper 16. In a pilot system, the bales may be approximately 8 inches in diameter and 20 inches long. A typical full scale system may utilize bales 36 inches in diameter and 48 inches long. The injection tube 18 may be five to seven feet long from the hopper 16 to the end thereof which is located inside the converter 12. The tube 18 may be made in sections connected by flanges 20. The section of the tube 58 which enters the converter 12 (see FIG. 4) may be of a material which is different from the rest of the tube 18 and which is more resistant to heat.

Figure 4:
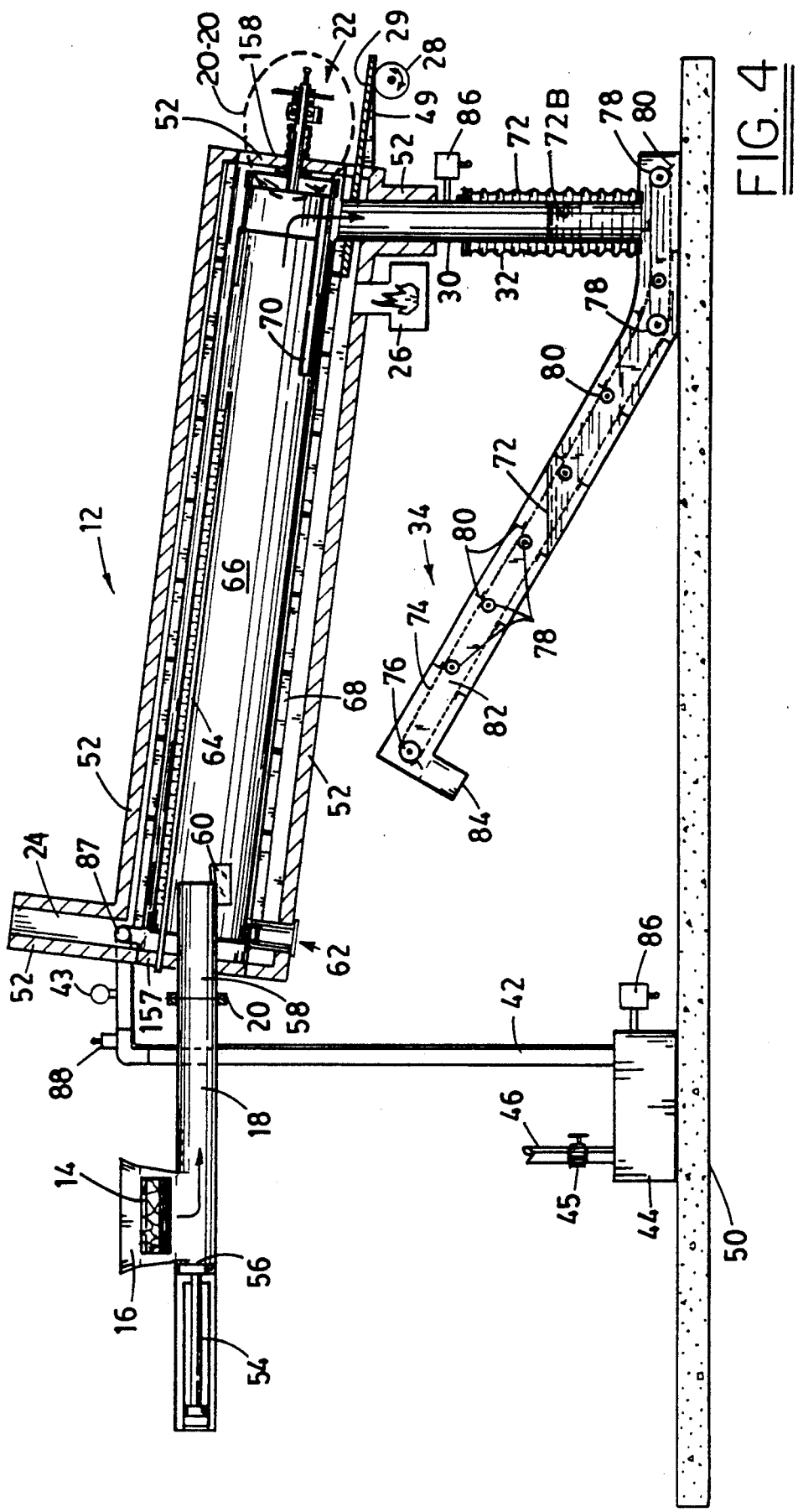
FIG. 4 is a longitudinal cross-sectional view through the axis of the converter drum with support structures removed to simplify the illustration.

The converter 12, as shown in FIG. 4, has a rotatable inner drum 66 in which pyrolysis occurs. Around the inner drum 66 is a stationary, non-rotating outer drum 68. This outer drum is closed at its ends by bulkheads 157 and 158 which define an essentially air-tight chamber around the rotating inner drum 66. The inner drum is rotated by a drive shaft assembly 22 having a sprocket 182 which is driven by an electric motor through a gear box 183, an output sprocket 187 from the gear box and an endless chain 185. The motor may be a one horse power (for a pilot, small size converter) to ten horse power for a typical full scale converter. The output RPM may be approximately 1,800 and the gear reduction in the box 183 may be 900 to one or 1,800 to one. The drive shaft (102, FIG. 20) of the assembly 22 may be 2.375 inches in diameter for the small scale converter to 4.5 inches in diameter for the full scale converter. The drive shaft assembly is water cooled and is described in greater detail in connection with FIG. 20.

Figure 15:
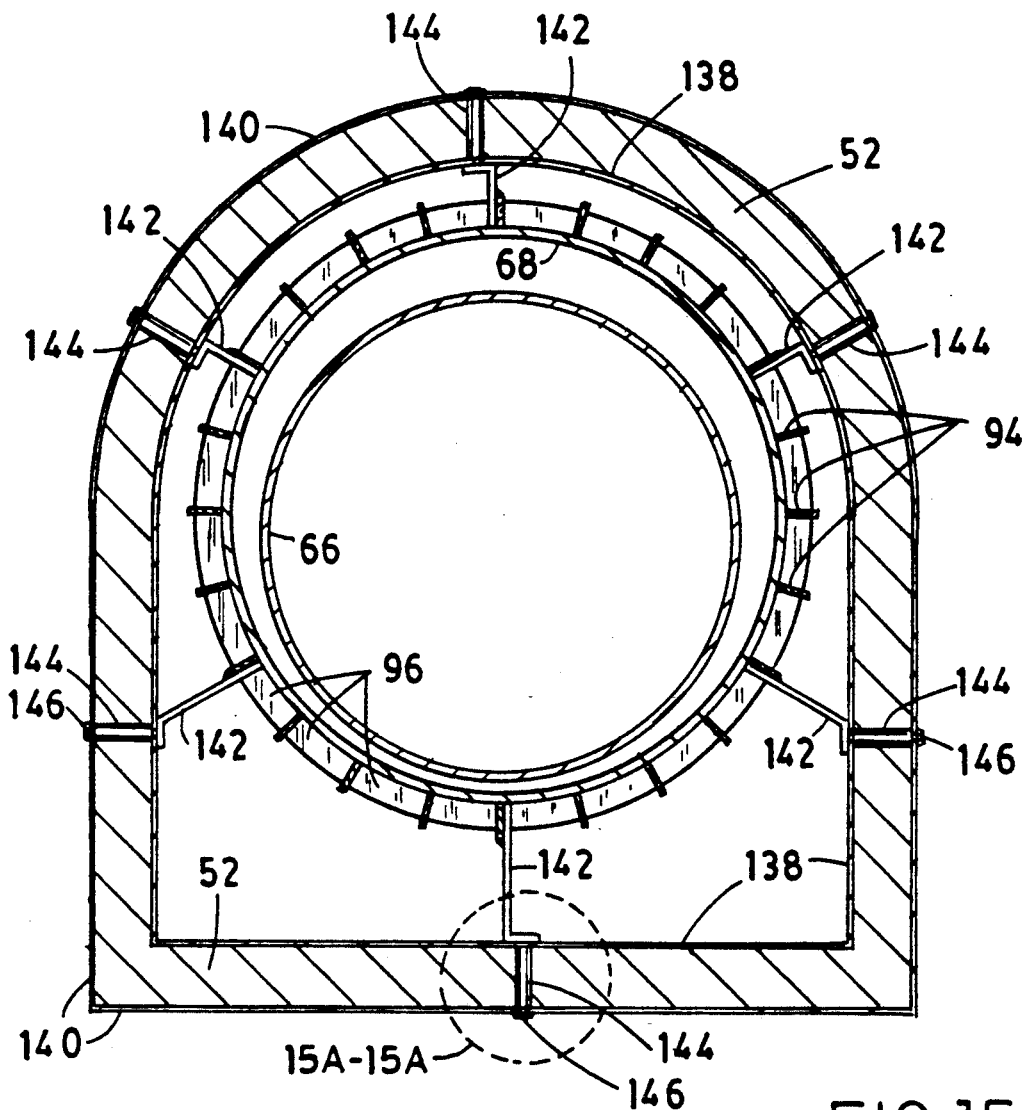
FIG. 15 is a sectional view taken along the line 15—15 in FIG. 5.
Figure 15A:
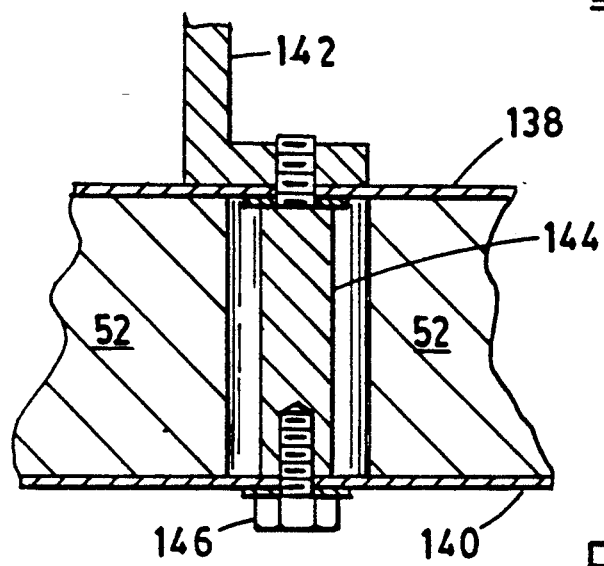
FIG. 15a is an enlarged view of the spacer and support arrangement shown in FIG. 15, the view being taken along the line 15a—15a in FIG. 15.
Figure 16:
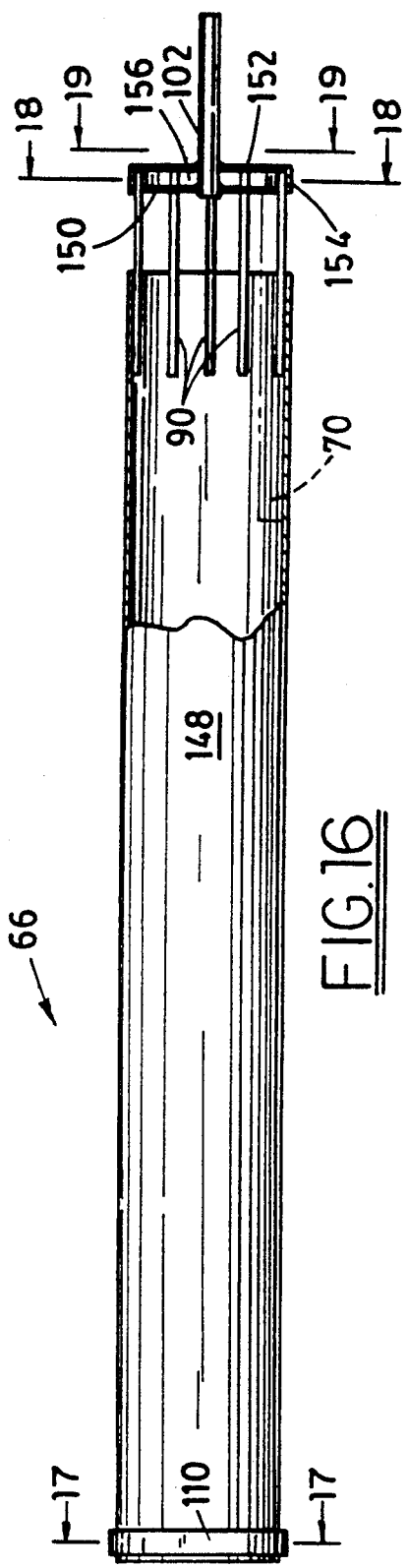
FIG. 16 is a side elevation of the converter drum assembly partially broken away at the discharge end thereof.
Figure 19:
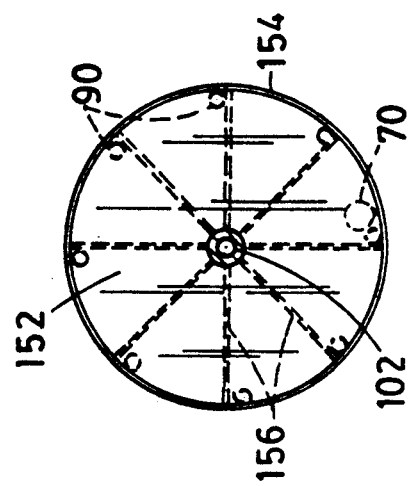
FIG. 19 is an end view of the assembly shown in FIG. 16 taken along the line 19—19 in FIG. 16.
Figure 18:
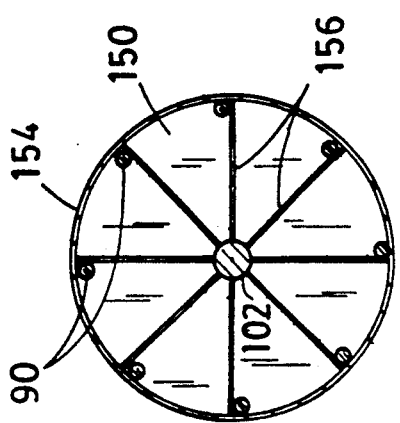
FIG. 18 is a sectional view taken along the line 18—18 in FIG. 16.
Figure 17:
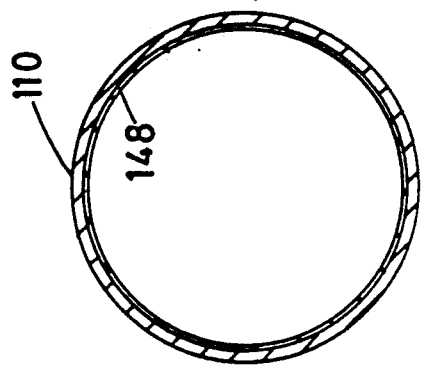
FIG. 17 is a cross-sectional view taken along the line 17—17 in FIG. 16.
Figure 39:
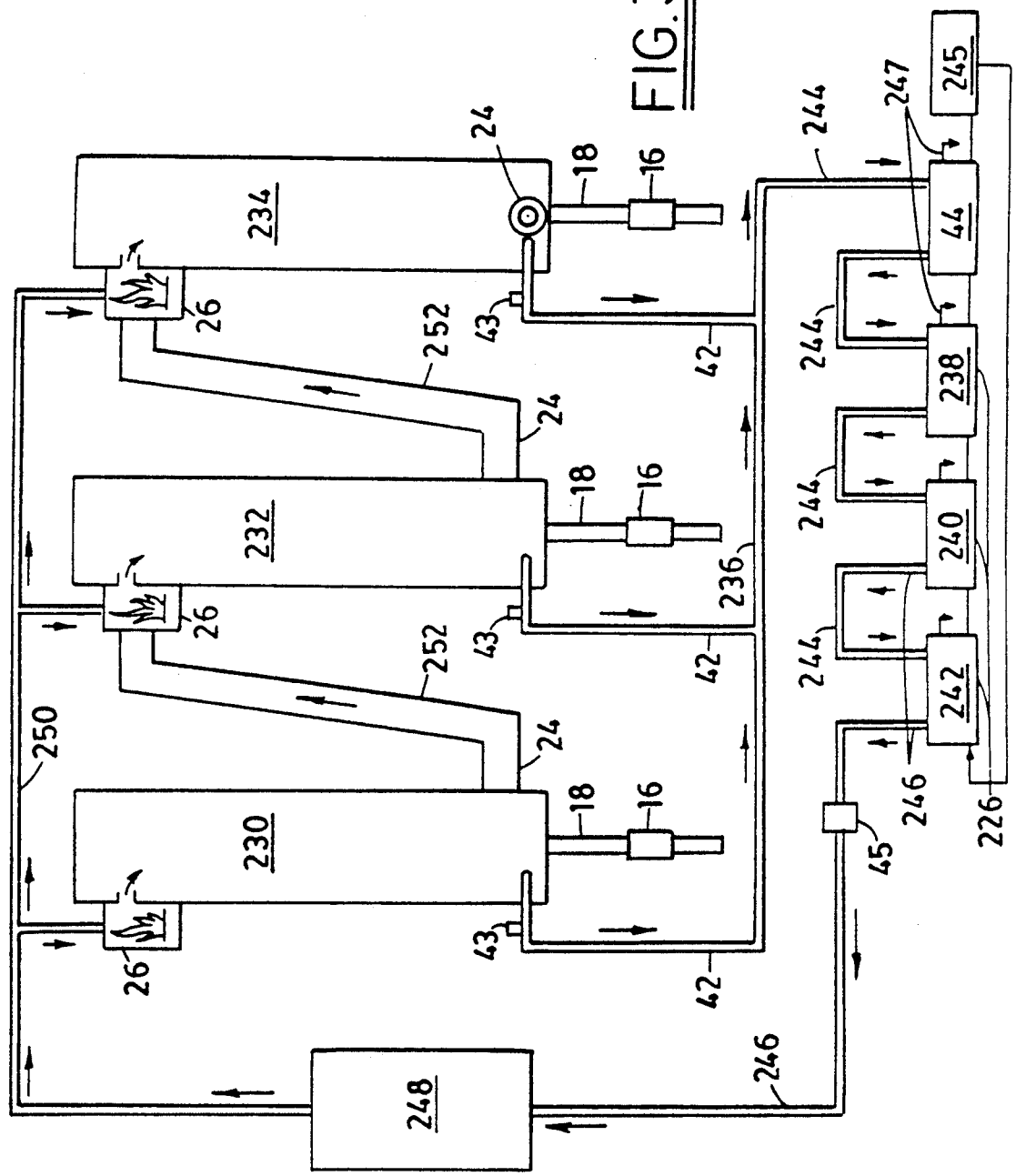
FIG. 39 is a schematic diagram of a multiple converter, pyrolytic conversion system embodying the invention.

The outer drum 68 is surrounded by a casing generally indicated by reference numeral 52 and shown in greater detail in FIGS. 15 and 15A. This casing defines an oven chamber around the outer drum through which combustion gases from a burner heat source 26 circulate. The burner 26 is preferably a forced air type where combustion air is fed through burners which burn product gases of pyrolysis during continuous operation of the converter 12. Thus, the hot gases circulate through the oven chamber under pressure. On startup, other heating gases such as propane may be used. The product gases of pyrolysis may be stored and used from storage, both on startup and during operation (see FIG. 39). Augmented, forced air may come from a gas turbine exhaust and the burner 26 may be of the type used for auxiliary firing of gas turbine exhausts. Such burners are also known as duct burners and are available from COEN Company, Inc., 1510 Raulins Road, Burlingame, Calif. 94010. The air flows through the oven chamber to an outlet chimney or flue 24. This flue may be connected to scrubbing equipment or pass through a so-called "bag house" if desirable or necessary for environmental protection purposes. The gases from the flue 24 may be used to preheat or provide hot combustion gases to the heater of a successive converter (instead of a gas turbine exhaust) in a multiple converter system as shown in FIG. 39.

The converter 12 and the injection tube 18 is supported on a framework 48 resting on the ground, preferably on a concrete slab 50. Inasmuch as the converter 12 can expand and contract with respect to the framework which supports it, the rear end of the converter 12 is mounted on a roller 28. The discharge of solid products of pyrolysis is through openings in the rear end of the rotating drum 66 and the outer drum 68 via a chute 30. This discharge chute 30 is mounted on a conveyor assembly 34 so that it can move with respect to the assembly 34. Such movement is facilitated by a flexible pipe or bellows 32 which surrounds the lower end of the discharge chute 30. The discharge chute 30 and the conveyor assembly is shown in FIGS. 27 through 32 which illustrates the connection between the discharge chute 30, the flexible bellows pipe 32 and the housing 82 of the conveyor assembly 34.

A seal is maintained at the discharge end of the converter in the chute by virtue of the chute; the conveyor housing 82, and the bellows pipe 32 being filled with liquid, preferably water. The height of the liquid is such that a pressure is presented to the chamber defined by the outer drum 68, which balances and maintains the pressure therein. A suitable pressure is slightly above atmospheric pressure (e.g. 5 PSIG). This water level is indicated at 72.

The pressure in the product delivery chute 30 may be sensed by a sensor 43 (FIG. 39) near the exit from the converter drum 66 and transmitted to a pressure regulator 45, located after the last condenser, which controls or balances the pressure so that the weight of the residue inside the discharge chute is just enough to overcome the friction of the residue. In effect, the pressure inside the converter drum 66 is raised enough to lower the water level inside the chute to within a few inches of the bottom of the discharge chute (to 72B in FIG. 4).

The conveyor casing 82 is closed by conveyor top 206 (see FIGS. 28–32), except for a discharge chute 84 which delivers the solid products of pyrolysis (principally char or carbon black) 38 to a conveyor 40. The conveyor 40 carries the residue which is discharged to apparatus (not shown) for separation of ferrous, nonferrous metals and other inorganic materials and processing or refining of the carbon black. The balance of the discharge may be used for land fill.

The residue of pyrolysis consist mostly of this carbon black or char and also contains ferrous and non-ferrous metals and other non-organic materials. Since these materials are discharged under water, they are quenched, cooled and cleaned of sulfur, ammonia, calcium chloride as they are fed through the water by a roller chain conveyor 74 driven by a drive sprocket 76 and carried on support sprockets 78. The chain conveyor carries the scrapper blades 80 so that they scrap the discharged products from the bottom of the conveyor housing 82 and carry them up through the water bath to a level which is elevated above the top level 72 of the water where they are discharged through the snout 84.

An outlet for volatile gases released during pyrolysis of the feedstock is shown at 87 near the inlet end of the rotary drum 66. These gases are carried by a delivery pipe 42 to a condenser 44 The pressure in the chamber defined by the outer drum is controlled by a pressure sensor 43 connected to the pipe 42 adjacent to the outlet 87 which operates a regulator valve 45 via conventional control equipment (not shown). The product gases are collected at a gas outlet pipe 46. They may be circulated through a series of tandem condensers as shown in FIG. 39. The non-condensable product gases are methane, propane, etc. These product gases are desirably used to fire the burner 26.

The condenser 44 is shown in greater detail in FIGS. 33 to 35. Generally, it is of the fluid bath type which has baffles 224 some of which extend below the level of the bath and which establish a gas stream over and through the bath so as to cool and clean the impurities in the volatiles. Such impurities are carbon particles, ash, calcium chloride (a product of lime which, optionally, may be injected into the converter to reduce the chlorine in certain plastics such as vinyls, PCBs, and alike, into calcium chloride). The bath also removes sulfur and ammonia. The petroleum or oil based volatiles condense and float on the top of the water in the bath. These oils may be collected via a valved discharge pipe (not shown) near the top of one of the side walls of the condenser 44. The temperature of the bath may be maintained by circulating or recirculating cooled or chilled water.

Figure 3:
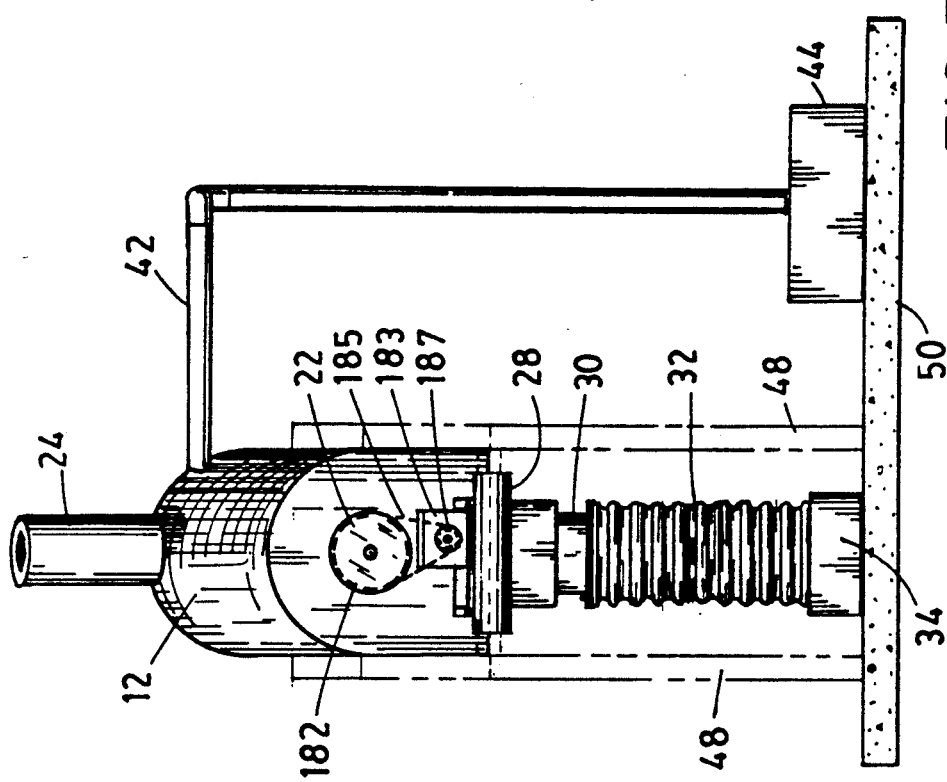
FIG. 3 is a rear elevational view of the system shown in FIG. 1.
Figure 2:
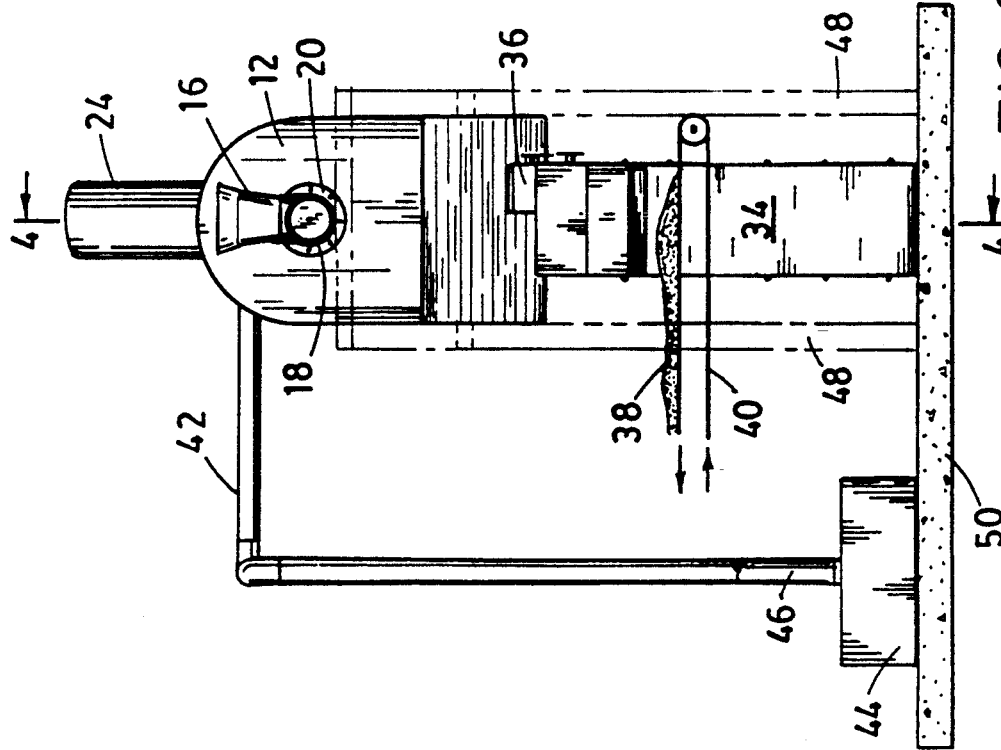
FIG. 2 is a front (take from the left in FIG. 1) elevational view of the system shown in FIG. 1.

The apparatus for introducing the feedstock bales or bags 14 utilizes a hydraulic cylinder 54 with a plunger 56 having a diameter approximately equal to the diameter of the tube 18. The term "bales" should be taken to include bags. As shown in FIGS. 21 through 24, the portion of the tube 18 below the hopper 16 has a cover 194 hinged at 198. The cover is opened and closed by a hydraulic cylinder 196. When the cover is open, a bale drops into the tube 18. Then the cover is closed as shown in FIG. 3. The hydraulic cylinder 54 is then operated and the plunger 56 rams the bale toward the inlet end of the converter 12. Bales are rammed one at a time. Since they are approximately the same diameter as the tube 18 they form a seal as they are compressed. Air and water trapped in and between successive bales is exhausted through air bleed holes 192 and water bleed holes 192A on the top and bottom of the tube 18 and adjacent to the hopper 16. As the bales enter the converter they are severed by a knife 60 attached to the end 58 of the injection tube 18 which is located inside the rotary converter drum 66.

On start up of the system or in the event that maintenance is required, it is desirable to purge the system. To this end inlet valves 86 allow an inert gas, such as $CO_2$, to pass into the chamber defined by the outer drum and through the outlet pipe 42. The purging gases are released via an outlet valve 88.

The outer drum 68 is best illustrated in FIGS. 5 through 9, 15 and 15A. This drum as well as other parts of the converter 12 which are at high temperatures are desirably made of stainless steel of the type and class capable of sustaining such temperatures. For example type 304 or 316 stainless. The bulkheads 157 and 158 are plates which are connected, in the case of the bulkhead 157 to the inner end 58 of the injection tube 18. There are radial gussets 92 on the outside of the rear bulkhead 158 around a journal 106 (see also FIG. 20) through which the drive shaft 102 of the drive shaft assembly 22 passes. The space between these gussets may be filled with insulating material, such as rock wool which is also shown at 52. The bulkheads 157 and 158 and their associated components therefore provide part of the oven casing. As well as serving the dual function of sealing the chamber in which the rotary drum is located and pyrolysis reactions occur.

The outer drum has longitudinal fins 94 which direct the combustion gases heated by the heater, and which pass through the heat source inlet 108, towards the outlet flue 24. These fins 94 are circumferentially spaced around the stationary outer drum 68. Between the longitudinal fins 94 (which also extend in the direction of the axis of rotation of the rotating converter drum 66) are spacer fins 96. These spacer fins 96 are longitudinally spaced from each other in the direction of the axis of rotation of the converter drum 66. The spacers for example may be at three foot intervals around the outside periphery of the stationary outer drum. These spacers create turbulence in the forced draft of hot gases which circulates through the oven chamber. Such turbulence enhances heat transfer from these hot gases to the outer drum, and thence to the chamber inside the outer drum 68, where the rotating drum 66 carries the feedstocks undergoing pyrolysis.

The outer drum 68 may have a diameter of approximately 19.125 inches in a small scale (pilot) converter and a diameter of 80 inches in a full scale converter. The converter drum 66 for a small scale (pilot) converter may be 17 inches in diameter, while in a full capacity converter the diameter of the converter drum 66 may be 72 inches.

The support of the converter 12 on the frame 48 is provided by the roller 28 which extends under a wedge shaped support platform 49 having an upper surface 29 which is parallel to the axis of rotation of the converter drum and the drive shaft 102 (see FIG. 4). The lower surface is generally parallel to the surface of the ground or support pad 50 (is horizontal). The inclination of the wedge therefore is approximately equal to the inclination of the axis of rotation of the converter drum which may be approximately 6°. In other words, the rear or discharge end of the converter drum and the inlet end of the converter drum are at different elevations; the inlet end being higher than the discharge end. The discharge end of the converter drum 66 is supported by the drive shaft 102 which is in turn supported in bearings in a pillow block resting on the rear support platform 49. This pillow block is shown at 180 (see FIG. 20). The forward end of the converter drum 66 and the outer stationary drum are supported on roller assemblies 62.

The roller assemblies 62 are shown in greater detail in FIGS. 10 to 14. A wear ring 110 is welded around the converter drum near the forward or inlet end thereof. Rollers 112 are rotatably mounted between thrust ball bearings 114 on a carrier 116. The wear ring 110 rests on the rollers 112. A plurality of roller assemblies are provided which are circumferentially spaced apart. Hardened bushings 118 surrounds ears extending laterally from each roller 112. These bushings 118 journal the rollers 112 in the carrier 116. The carrier is a rectangular block which rests on an inner pipe 122 of a pipe assembly including the inner pipe 122. This assembly contains an outer pipe 120 which is welded to a flange 126 and rests upon a blind flange 128. A shim disk 124 is located inside the outer pipe 120 under pipe 122, on the flange 128. By selecting the thickness of this shim the converter drum 66 may be adjusted.

An adjustment to the inclination of the converter may be made by raising, (e.g., about 2° or lowering about 2°) the high end of the unit 12 at the support frame 48. The floating lower end of the discharge chute 30 inside the bellows 32 allows for this 2° plus or minus adjustment. Such adjustment will depend upon the nature of the feedstocks, since the angle of inclination of the converter drum determines the rate at which the feedstocks travel through the converter drum and their duration in the drum. Different feedstocks may require different lengths of time of pyrolysis in order to complete the pyrolysis reaction.

An inlet and an outlet for pipes 132 and 144 which respectively carry water into and out of the chamber formed inside the inner pipe 122 are provided for cooling each roller assembly 62. A drain plug 130 or a drain valve may be used to drain the water from the roller assembly.

The outer pipe 120 extends to the outer, stationary drum 68 and, with the aid of gussets 136, supports the roller assemblies 62.

Referring to FIGS. 15 and 15A, the support for the oven casing 52 and the design of the oven casing are shown in greater detail. The oven casing has an inner shield or cover 138 and an outer shield or cover 140. These shields are separated by spacers 144. The spacers 144 are connected to support members 142 by being threaded therein. The spacers themselves are secured by spacer bolts 146. The support members 142 are attached to different ones of the longitudinal spacer fins 194 on the stationary outer drum 68. Six support members are shown which are spaced apart 60° from each other circumferentially around the stationary drum 68. The spaces between the shields 138 and 140 are desirably filled with insulating material, such as rock wool.

In order to scrape material which may adhere to the inside periphery of the converter drum 66, a scraper assembly 64 is provided. This assembly includes a rod in a sleeve (not shown) which is welded to the upper (above the meridian through the axis of rotation of the converter drum) gussets 92 of the bulkhead 157. Scraper blades are yieldably connected, as by being mounted on springs (see FIG. 7) and engage the inside periphery of the converter drum 66 above the meridian through its axis of rotation.

As shown in FIG. 5 and in greater detail in FIGS. 16-20, the converter drum 66 has torque rods 90 which are circumferentially spaced at equal angular increments and extend between the end of the rotating converter which is defined by bulkheads 150 and 152. These bulkheads are interconnected by gussets 156 which extend radially to the drive shaft 102 and may be welded thereto. The bulkheads 150 and 152 are disks which are also welded to the drive shaft 102. A ring or flange 154 extends longitudinally between the bulkheads. The torque rods are preferably welded to the ring 154 as well as to the gussets 156. The torque rods extend into the rear end of the converter drum 66 and are welded to the inner periphery thereof. These torque rods 90 define gaps or openings through which the solid products (residue) of pyrolysis reaction in the converter drum fall into the discharge chute 30. The length of these openings defined by the rods 90 (in a direction along the axis of rotation) may be nine inches in a small-scale pilot converter and twelve to eighteen inches in a full-scale converter. The torque bars themselves may be six in number in a small-scale converter and one inch in diameter. In a large-scale converter, twelve torque bars, two inches in diameter, may be used. The opening in the outer drum 68 faces these openings in the converter drum and may be nine inches by twelve inches (rectangular) for a small-scale converter and eighteen inches by sixteen inches for a full-capacity converter. The discharge chute 30 may be rectangular where it meets the discharge opening. The duct work may vary to a circular cross-section from the rectangular cross-section in the lower part of the chute 30 where the bellows pipe 32 surrounds the chute 30.

A preferably circular or octagonal crusher bar 70 having a length longer than the torque bars 90 but not more than twice the length of the torque bars is disposed loosely in the discharge end of the converter drum 66. As the converter drum rotates (FIG. 8), the crusher bar 70 is picked up by the torque rods, elevated and then released, thereby crushing clumps in the residue and pulverizing them into particles which fall down through the openings between the torque bars 90. The weight of this residue overcomes the pressure presented by the water in the discharge chute so that the residue drops through the discharge chute and the water into the conveyor housing 82 (FIGS. 27-32) where a conveyor having scraper blades 80 pick up the residue and carries it up to a discharge snout 84.

In order to reduce the presence of chlorinated organic hydrocarbons in the residue which is discharged from the converter drum 66, a source of a reagent which reacts with chlorine in such hydrocarbons may be injected in the inlet end of the converter drum. For such purpose, lime may be used which is injected via a control valve 98 through an injection pipe 100 into the inlet end of the converter drum 66 below the meridian thereof (the generally horizontally disposed plane through the axis of rotation of the drum 66). Calcium in the lime reacts with the chlorine of the chlorinated hydrocarbons to produce calcium chloride which is cleaned from the residue (mostly char) discharged via the water bath in the conveyor housing 82 and the chute tube 30.

Figure 20:
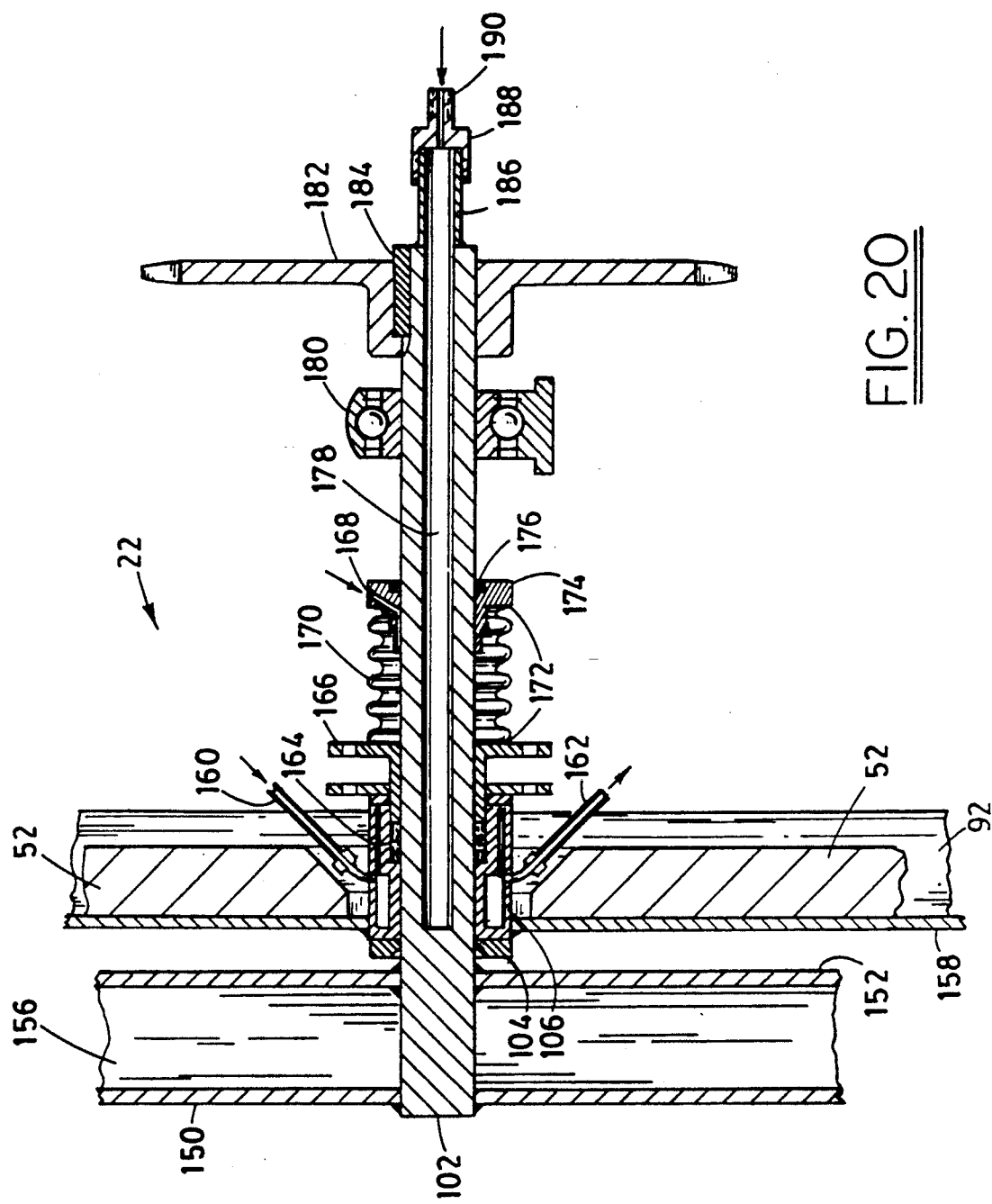
FIG. 20 is an enlarged fragmentary cross-sectional view of the drive shaft assembly at the discharge end of the converter drum, taken along a vertical plane through axis of rotation of the converter drum.

Referring more particularly to FIG. 20, there is shown the drive shaft assembly 22. The principal feature of this assembly is that it is water cooled so that it can operate reliably in the high temperature environment of the converter 12. The drive shaft assembly includes the drive shaft 102 and a journal 106. A thrust washer 104 is disposed between the bulkhead plate 152 at the rear end of the converter drum and the bulkhead 158 at the rear end of the outer, stationary drum. The journal 106 defines a stuffing box containing high-temperature packing 164 and a chamber where water is contained as it is circulated between a water inlet 160 and a water outlet 162.

The packing 164 is contained by a packing gland 166 which is also water cooled within a chamber thereof defined by a bellows 170. The bellows 170 may be welded at the end thereof to the flange of the gland 166 and to a seal carrier 174. The welds are shown at 172. A seal 176, preferably of the Garlock type, extends around the drive shaft 102 in the seal carrier 174. The water connection 168 is dead-headed. It may be connected to a T-connector through which water circulates. Accordingly, there may be a convective flow of water which cools the seal and the shaft 102. The water is pressurized at the same pressure as the inside of the converter and the discharge chute; or slightly above to ensure that no gases can escape through seal 164. A small water leak into the converter can be tolerated. The shaft 102 also has a cavity 178 (a hole) bored therein which extends into the area of the journal 106. A jack shaft 186 extends rearwardly from the drive shaft 102 and is connected through a swivel 188 which has a water inlet connection 190. Again, a T-connection for water circulating past the swivel may be provided to accommodate convective flow of the water in the cavity 178. Alternately, a small pipe may be inserted through the swivel into the far end of the water cavity 178 which forces cool water to the far end of the cavity, while discharging the warm water through the same swivel.

The pillow block, which supports the drive shaft and through which the rear end of the converter 12 is supported, is shown at 180 and FIG. 20, and was discussed above. The shaft drive sprocket 182 is also shown in FIG. 20 keyed to the shaft by a key 184. This drive sprocket 182 is connected via the chain 185 and sprocket 187 to the gear box 183 as shown in FIG. 3.

The discharge chute 30 and the conveyor assembly 34 were mentioned above in connection with FIGS. 27-32. Referring again to these figures, it will be seen that the upper end of the bellows pipe 32 is fixed to the outer periphery of the chute by gussets 200 and flanges 204 (FIG. 25 and 26). A bleed-off valve to allow air to bleed from the bellows above the water level therein is shown at 202. The bellows pipe is connected by being welded to a ring 206 which is spaced above the inverted end of the sides 208 of the conveyor housing 82. This inverted end is sandwiched between the ring 206 and a flange 210 around the bottom of the chute 30. As shown in FIG. 28, which illustrates the non-thermally expanded condition and exemplary 6° slope of the converter 12 and FIG. 29 which shows expansion by a displacement 212, it will be seen that the bellows pipe 32 enables movement of the discharge chute with respect to the conveyor housing 82 and accommodates such movement. Even in a small-scale converter, the movement may be two and one-half inches due to thermal expansion of the converter 12. Such movement is accommodated by the bellows pipe arrangement which enables relative motion of the discharge chute 30 with respect to the conveyor housing 82 while maintaining the liquid seal.

An underwater support sprocket 78, FIG. 30 for the roller chain 74 of the conveyor is carried on a shaft 213 by being keyed thereto. This shaft is journaled in stuffing boxes 216 on the side walls 208 of the conveyor housing 82. The shaft is journaled and supported in pillow blocks 214. The scraper blades 80 are carried on the chain 74. The end tips 218 of the blades 80 are bent up (FIG. 32) and in a forward direction in which the conveyor is moving in order to collect and sweep the solid products (residues) along the floor of the conveyor housing 82 and push them out of the exit snout 84 (FIG. 25).

The pyrolysis reactions occur while the feedstocks are being carried by the rotary motion of the converter drum 66 up the inner periphery of the drum. When the feedstocks overcome the angle of repose, they tumble down and have a component of forward motion due to the inclination of the axis of the drum. As noted above, the inclination used is selected in accordance with the feedstocks which are to be processed in order to give the required residence time in the converter for completion of pyrolysis. A steeper angle shortens the residence time, because the materials are carried up the side walls generally perpendicular to the axis of rotation and tumble back down in a direction which is essentially vertical.

The gases consisting of methane, water vapor and other volatiles are released during pyrolysis of the materials and exit the outlet 87 to the delivery pipe 42. This delivery pipe first enters the condenser 44 (see FIGS. 33 to 35) which contains a bath of water to a level 222 above which is a layer of oil to a level 220. The oil may be provided by the condensed hydrocarbon gases which are delivered through the pipe 42. These gases flow under pressure, since the converter inner drum is pressurized (for example, to 5 PSIG as noted above). Baffles 224 direct the gases into the oil, since they are not long enough to extend below the water level 222. Longer baffles 224 direct the gases into the water. These baffles cause the gases to circulate and be cleaned of impurities such as carbon particles, ash, calcium choride (the product of lime added to the process in the converter drum plus chlorine from chlorinated plastic such as vinyls, PCBs and the like). Also, sulfur and ammonia are cleaned from the gases. The temperature in the bath is maintained so as to condense aromatics, light and heavy oils without separation and water vapors if a single condenser 44 is used. If multiple condensers are used, upstream condensers which are of the fluid swept, rather than fluid bath type, are used to condense first heavy oils then light oils as temperatures decrease while the last condenser 44 condenses aromatics and water vapor. The condenser 44 also functions as a trap to prevent air from entering the converter(s). The oils which are condensed are removed from the oil layer, for example, by valved pipes or outlets which maintain the level 220. The water below the level 224 may be circulated through heat exchangers or chillers and maintained at the temperature for condensing aromatics and water vapor. Also, treatment facilities may be provided to maintain the water at a desired pH level. As noted above, non-condensable gases may be used for operating the burners to heat the converter 12. Alternatively, they may be compressed and stored for later use in the process (for example, on startup instead of propane) or for other purposes.

Figure 37:
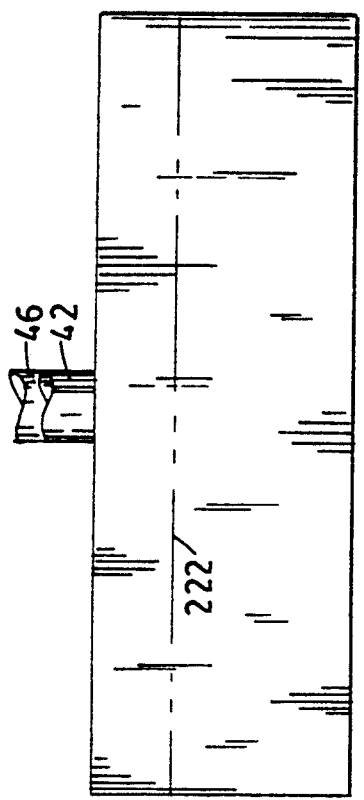
FIG. 37 is a side elevation of the condenser shown in FIG. 36.
Figure 36:
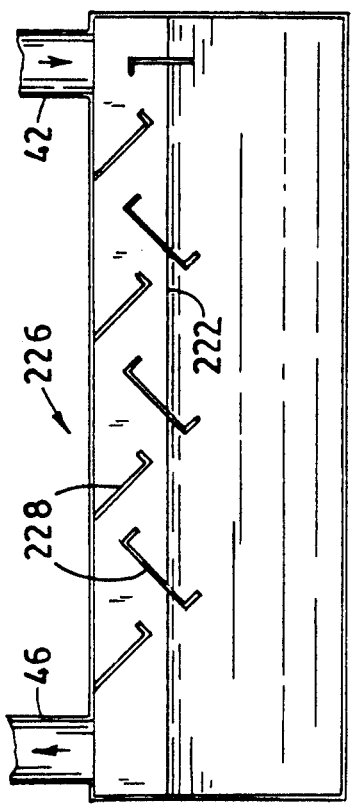
FIG. 36 is a cross-section taken along the line 36—36 of FIG. 38 of one of the three final condensers shown in FIG. 39.
Figure 38:
FIG. 38 is a bottom view of the condenser shown in FIG. 36.

A fluid swept condenser is shown in FIGS. 36, 37 and 38. This condenser includes baffles 228 which like the baffles 224 of the condenser 44 may be connected to and supported by opposite side walls of the condenser housing. Alternate ones of these baffles extend below the fluid level 222 and cause the gas stream to sweep over the fluid. These condensers are identified by reference numeral 226 to differentiate them from the baffles in the condensers 44.

A series of condensers 44 and 226 may be connected in tandem for processing condensing and cleaning the product gases from a plurality 230 to 234 of converters as shown in FIG. 39 or from a single converter. The last condenser in the series is of the fluid bath type 44, while the remaining condensers 238, 240 and 242 are of the fluid swept type 226. These fluid swept condensers force the gases to expand and contract to create turbulence and cool as they sweep above the fluid. The temperatures of the various condensers may be gradually decreased. For example, the temperature of the first condenser 238 may be controlled to be at 350° F., the second 240 at 290° F., and third 242 at about 230° F. and the last 44 at about 140° F. These temperatures are sufficient to keep water vapors in suspension in the gas stream until the last condenser 44 is reached, while allowing light and heavy oils to condense and also permitting the cleaning of the impurities in the gas stream. Since, the temperature of the last condenser 44 is about 140° F., most light aromatics and water vapors are condensed therein as discussed above. In order to maintain the temperature of the condensers at the desired temperature, cool water may be circulated via a chiller or heat exchanger 245 or from the public water supply to the lowest temperature condenser 44. Warmer water is withdrawn from the lower temperature condensers and then circulated to the higher temperature condensers, thus by maintaining only one temperature, all of the temperatures of the condensers in the series may be maintained. As noted above, the oil may be extracted by withdrawing it as it is separated from the gas stream in each of the condensers as shown by the outlets 247 from each of the condensers. The non-condensable gases are desirably compressed and stored in a tank 248 and then used in the heat source (burners) 26.

As noted above, the chimneys or flues 24 of the first converter 230 may be connected via ducts 252 to the heat source 26 of the next successive converter 232. Similarly, the flue 24 of the converter 232 may be connected to the next converter 234. The chimney of the last converter 234 may be allowed to dissipate or may be connected to a burner to burn off any combustibles therein. Alternatively, the chimney 24 may be connected by another duct (not shown) to the burner 26 of the first converter 230.

The temperature within the converter drum in the converter 12 or in the plurality of converters 230, 232 and 234 is desirably maintained at approximately 1200°. This temperature may be insufficient to reduce certain chlorinated hydrocarbons to within levels considered environmentally safe. For example, PCBs may be contained in the residue from the discharge chute 30. To this end, a secondary converter 254 which is operated at higher temperature may be used. The residue is fed into the inlet end of a converter drum 258 of the secondary converter 254 by a chute 256 (see FIG. 40). The converter 254 is similar in design to the converter 10 as described above in connection with FIGS. 1-38. It has an outer stationary drum 260, a casing 52 defining an oven chamber, and a drive shaft assembly 262. The auxiliary converter is supported on additional members of the framework 48. The discharge from the secondary converter 254 is through a chute 30 and conveyor assembly 34 of the type described in connection with FIGS. 1-38, and like parts are identified by reference numerals used in describing them in connection with FIGS. 1-38. The burner of the secondary converter 254 desirably operates to heat the chamber containing the converter drum 258 to about 2400° F. which is believed sufficient to destroy the PCBs upon pyrolyzation. This temperature is only approximate and such temperatures are used which are sufficient to provide a residue which is within environmentally safe levels.

From the foregoing description, it will be apparent that there has been provided an improved pyrolytic conversion system. Variations and modifications of the herein described system within the scope of the invention will undoubtedly suggest themselves to those skilled in the art. Accordingly, the foregoing description should be taken as illustrative and not in a limiting sense.

I claim:

1. A pyrolytic conversion system for hydrocarbon containing materials which comprises a converter drum having opposite ends, a first of which is elevated above a second of which, said drum having an axis of rotation about which said converter drum is rotatable, an outer stationary drum disposed around said converter drum and defining a first chamber within which said converter drum is disposed, a casing disposed around said outer drum defining an oven chamber, means for heating said oven chamber to maintain the converter drum at a temperature sufficient to pyrolyze said materials, means in communication with said first chamber near the first end of said converter drum for extracting product gases of pyrolyzation, means disposed in essentially air tight relationship with said first chamber near the second end of said converter drum for the discharge of solid products of pyrolyzation, and means extending through said first chamber for injecting said materials into said first end of said converter drum while essentially excluding air from said first chamber.

2. The system according to claim 1 wherein said converter drum is many times longer along the axis thereof than the diameter thereof.

3. The system according to claim 1 wherein said outer drum has opposite ends, and bulkheads mounted across said opposite ends of said outer drum sealing said first chamber.

4. The system according to claim 3 wherein said outer drum has a plurality of fins extending into said oven chamber for facilitating heat transfer to said first chamber and to said converter drum.

5. The system according to claim 4 wherein said outer drum has an outer periphery, said plurality of said fins including fins extending longitudinally along said outer periphery and fins spaced laterally from each other about said outer periphery, said longitudinally and laterally spaced fins defining a matrix of fins on said outer drum and around said first chamber.

6. The system according to claim 1 wherein said heating means comprises inlet means for heated gases into said oven in the vicinity of said second end of said converter drum and outlet means for said heated gases in the vicinity of said first end of said converter drum, means for supplying heated gases connected to said inlet means, and a flue connected to said outlet means.

7. The system according to claim 6 wherein said outer drum has an annular outer periphery exposed to said oven chamber, a matrix of annular fins and longitudinally disposed fins projecting from said outer periphery into said oven chamber for establishing a turbulent flow of said heated gases through said oven chamber in heat exchange relationship with said fins.

8. The system according to claim 6 wherein said outer drum and said casing have bottoms disposed below said axis, said discharge means includes a chute extending into said first chamber through the bottoms of said outer drum and said casing to a location adjacent said second end of said converter drum, said converter drum being open to said location, said inlet means being disposed in the bottom of said casing spaced away from said chute towards said first end of said converter drum.

9. The system according to claim 8 wherein said chute is filled with liquid to a level sufficient to at least balance the pressure in said first chamber, and said discharge means being part of an assembly containing said liquid and containing a conveyor extending to and communicating with the bottom of said chute for carrying and discharging said solid products above the level of said liquid in said chute.

10. The system according to claim 9 further comprising means supporting said casing and said outer drum and said converter drum for movement longitudinally in a direction along said axis in response to thermal expansion and contraction, and means mounting said chute on said assembly for movement with said casing, outer drum and converter drum.

11. The system according to claim 10 wherein said mounting means includes a flexible bellows pipe around said chute and extending to said assembly for containing said liquid therein.

12. The system according to claim 9 further comprising means connected to said chute and to said product gases extracting means for purging said chute, said first chamber and said product gas extracting means with $CO_2$ or another non-combustible gas.

13. The system according to claim 1 further comprising means for supporting said converter drum for rotation comprising a plurality of rollers offset from each other on which said converter drum rests adjacent said first of the opposite ends thereof, stanchion means extending through said outer drum in essentially airtight relationship therewith for supporting said rollers, a bulkhead defining said second end of said converter drum, a drive shaft connected to said converter drum bulkhead and journaled in sealed relationship with said oven chamber, said oven chamber having first and second ends at the opposite ends of said outer drum, said first and second ends respectively facing said first and second ends of said converter drum, said shaft extending through said second end of said oven chamber, and means rotatably supporting said shaft.

14. The system according to claim 13 further comprises means for cooling said stanchion means with liquid.

15. The system according to claim 13 further comprising means for cooling said drive shaft and the journal thereof with liquid.

16. The system according to claim 13 further comprising struts between said oven chamber casing and said outer drum for supporting said oven chamber casing on said outer drum, said outer drum also being connected in supported relationship with said stanchion means.

17. The system according to claim 16 wherein said casing has an inner and an outer shell providing a heat shield, said shells being spaced from each other, and insulation disposed between said shells.

18. The system according to claim 1 wherein said converter drum has crusher a bar loosely disposed therein along the axis thereof adjacent to said second end thereof, and means inside of said converter drum for elevating and releasing said bar permitting said bar to fall and pulverize said solid products into particles which enter said discharge means.

19. The system according to claim 18 wherein said elevating and releasing means comprises a bulkhead defining said second end of said converter drum, a plurality of rods mounted to said converter drum and spaced circumferentially from each other and extending longitudinally in a direction along the axis of said converter drum from said bulkhead toward said first end of said converter drum, an opening defined in the converter drum between a plurality of said rods for discharge of said solid products, said rods engaging, elevating and releasing said crusher bar as said converter drum rotates.

20. The system according to claim 19 wherein said opening is defined in the converter drum between each of said rods in the form of a plurality of circumferentially spaced openings around said converter drum, and said discharge means comprising a chute extending through said outer drum and having an inlet end facing said circumferentially spaced openings.

21. The system according to claim 1 wherein said converter drum has an inside periphery, and further comprising means extending along the axis of said converter drum, and engagable with said inside periphery for scraping material off said inside periphery as said converter drum rotates.

22. The system according to claim 21 wherein said scraping means is engagable with said inside periphery in a region above a meridian plane through the axis of said converter drum.

23. The system according to claim 22 wherein said scraping means has a length exceeding half the length of said converter drum.

24. The system according to claim 22 wherein said outer drum has a first bulkhead adjacent to said first end of said converter drum, a rod secured to said first bulkhead and extending through said first end of said converter drum, and blade means yieldably secured to said rod and disposed in scraping relationship with said inside periphery.

25. The system according to claim 1 wherein said injecting means comprises a tube projecting through said first end of said converter drum so that an end of said tube projects into said converter drum, said tube having a cross-section, means for supplying said materials to said converter drum in bales or bags which are disposed successively in end to end relationship in said tube, said bales having a cross-section approximately the same dimensions as said cross-section of said tube so as to form an essentially air tight seal in said tube, and openings defined in said tube for discharging fluid trapped in said tube and between the bales or bags entering said tube and bales ahead of said entering bales or bags.

26. The system according to claim 25 wherein said outer drum has a bulkhead defining an end thereof adjacent to said first end of said converter drum, said tube extending through said bulkhead.

27. The system according to claim 25 wherein said injecting means further comprises a hopper for containing said bales, and having upper and lower ends, a pivotable cover extending across said lower end and defining a portion of said tube below said hopper, and means for pivoting said cover to open position to allow said bales to enter said tube from said hopper one at a time.

28. The system according to claim 27 further comprising a ram having a plunger of cross sectional dimensions approximately the same as the cross-section of said tube, said plunger being reciprocable across said portion of said tube for ramming said entering bales said succession of bales along said tube into said converter drum.

29. The system according to claim 28 further comprising means projecting at least partially across the end of said tube which projects into said converter drum for severing said bales as they enter said converter drum.

30. The system according to claim 28 wherein said openings for discharging trapped fluid are disposed adjacent to said hopper and spaced from said hopper in the direction of the projecting end of said tube.

31. The system according to claim 1 wherein said means for extracting product gases comprises a plurality of fluid containing condensers, and means connecting said condensers in tandem for the flow of said product gases successively therethrough.

32. The system according to claim 31 wherein a last of said plurality of condensers in the path of said gases from said converter drum has baffles therein for directing said gases into the bath therein, and others of said condensers have baffles for directing the gases across the surface of the bath therein.

33. The system according to claim 31 further comprising means for maintaining the baths in said condensers at successively lower temperatures, the highest of said temperatures being in one of said condensers through which said gases from said converter drum first passes, the temperature in the last of said tandem connected condensers being below the condensation temperature of water vapor.

34. The system according to claim 33 wherein the lowest of said successively lower temperatures is about 140° F.

35. The system according to claim 1 wherein a plurality of pyrolytic converters are provided each having the elements set forth in claim 1, and further comprising common means connected to the product gases extracting means of said converters for cleaning said product gases and providing at least some of said product gases to the heating means of said converters for combustion therein, said converters having flues extending from the oven chambers thereof in the vicinity of said first ends of said converter drum thereof, and means for connecting the flue of at least on of said plurality of converters to the heating means of another of said plurality of converters for preheating said heating means.

36. The system as set forth in claim 1 further comprising means for injecting calcium containing material into the first end of said converter drum.

37. The system according to claim 1 further comprising a second pyrolytic converter having inlet means for solid materials and discharge outlet means for solid pyrolyzed materials, said inlet means being connected to said discharge means from said converter drum.

38. The system according to claim 37 wherein said second pyrolytic converter has a second converter drum having an axis inclined downwardly from the inlet to the discharge outlet thereof, a second stationary outer drum around said second converter drum defining a second chamber through which said inlet extends, a casing around said second drum defining a second oven chamber, said discharge of said second converter including a chute in communication with said second converter drum at the lower end thereof, and means associated with said chute for maintaining said first chamber and said second chamber in substantially airtight relationship.

39. The system according the claim 38 wherein said means associated with said chute comprises means for maintaining liquid in said chute at a level to present a pressure at least equal to the pressure in said first and second chambers.

40. In a pyrolytic converter having a rotatable converter drum having an axis of rotation and first and second ends where materials to be pyrolyzed are introduced and discharged, respectively, the improvement for pulverizing solid products of pyrolyzation which comprises a crusher bar loosely disposed in said drum along the axis thereof adjacent to said second end thereof, means inside of said converter drum for elevating and releasing said bar permitting said bar to fall and pulverize said solid particles into particles which are discharged from said converter drum, and wherein said elevating and releasing means comprises a bulkhead defining said second end of said converter drum, a plurality of rods mounted to said converter drum and extending from said bulkhead in the direction along the axis of said converter drum towards said first end of said converter drum, said rods being spaced circumferentially from each other, an opening defined in said converter drum between said rods for discharge of said solid product, said rods engaging, elevating and releasing said crusher bar as said converter drum rotates.

41. The system according to claim 40 wherein said opening is defined in the converter drum between each of said rods in the form of a plurality of circumferentially spaced openings around said converter drum.

* * * * *